(12) United States Patent
Hoshino et al.

(10) Patent No.: US 8,121,621 B2
(45) Date of Patent: Feb. 21, 2012

(54) POSITION ESTIMATION SYSTEM

(75) Inventors: Jin Hoshino, Chiyoda-ku (JP); Susumu Ogata, Chiyoda-ku (JP); Masatoshi Kimoto, Chiyoda-ku (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 862 days.

(21) Appl. No.: 12/163,386

(22) Filed: Jun. 27, 2008

(65) Prior Publication Data

US 2009/0005083 A1 Jan. 1, 2009

(30) Foreign Application Priority Data

Jun. 27, 2007 (JP) ................................. 2007-169570

(51) Int. Cl.
*H04W 24/00* (2009.01)

(52) U.S. Cl. .................. 455/456.2; 455/456.5; 455/457; 342/357.49; 342/357.2; 342/357.78

(58) Field of Classification Search ............... 455/456.2, 455/456.5, 457; 342/357.49, 357.2, 357.78
See application file for complete search history.

(56) References Cited

U.S. PATENT DOCUMENTS

| | | | |
|---|---|---|---|
| 6,052,597 A | 4/2000 | Ekstrom | |
| 6,347,230 B2 | 2/2002 | Koshima et al. | |
| 6,349,211 B2 | 2/2002 | Koshima et al. | |
| 6,865,395 B2 | 3/2005 | Riley | |
| 7,430,422 B2 | 9/2008 | Nagatsuma et al. | |
| 2003/0125045 A1 | 7/2003 | Riley et al. | |
| 2005/0020309 A1 | 1/2005 | Moeglein et al. | |
| 2006/0025153 A1 | 2/2006 | Inaba | |
| 2007/0063897 A1 | 3/2007 | Matsuda | |
| 2007/0077945 A1* | 4/2007 | Sheynblat | 455/456.5 |

FOREIGN PATENT DOCUMENTS

| | | |
|---|---|---|
| EP | 1 301 055 A1 | 4/2003 |
| JP | 08-336178 A | 12/1996 |
| JP | 9-172676 | 6/1997 |
| JP | 11-252622 | 9/1999 |
| JP | 2002-512373 | 4/2002 |

(Continued)

OTHER PUBLICATIONS

Japanese Office Action w/Translation, dated Nov. 15, 2011, 11 pages.

*Primary Examiner* — Nimesh Patel
(74) *Attorney, Agent, or Firm* — Crowell & Moring LLP

(57) ABSTRACT

A position of a mobile communication terminal in an environment where the terminal cannot communicate with a GPS is defined more narrowly than a sector area of a base station in which the mobile communication terminal is located so that the position of the mobile communication terminal can be estimated more accurately. Even if a mobile communication terminal is in an environment where the terminal cannot communicate with a GPS, the latitude and longitude of the center of a sector of the wireless base station in which the mobile communication terminal is located is obtained according to a predetermined calculation by a base station database device, and the obtained latitude and longitude is sent back as an estimated latitude and longitude of the mobile communication terminal to the mobile communication terminal via the wireless base station.

15 Claims, 13 Drawing Sheets

FOREIGN PATENT DOCUMENTS

| | | |
|---|---|---|
| JP | 2002-159041 A | 5/2002 |
| JP | 2002-232933 | 8/2002 |
| JP | 2005-536110 | 11/2005 |
| JP | 2006-502602 | 1/2006 |
| JP | 2006-33207 | 2/2006 |
| JP | 2006-86814 A | 3/2006 |
| JP | 2006-295742 A | 10/2006 |
| JP | 2007-13500 A | 1/2007 |
| WO | WO 99/54752 | 10/1999 |
| WO | WO 02/47421 A1 | 6/2002 |
| WO | WO 03/052451 | 6/2003 |
| WO | WO 2005/012939 A1 | 2/2005 |

* cited by examiner

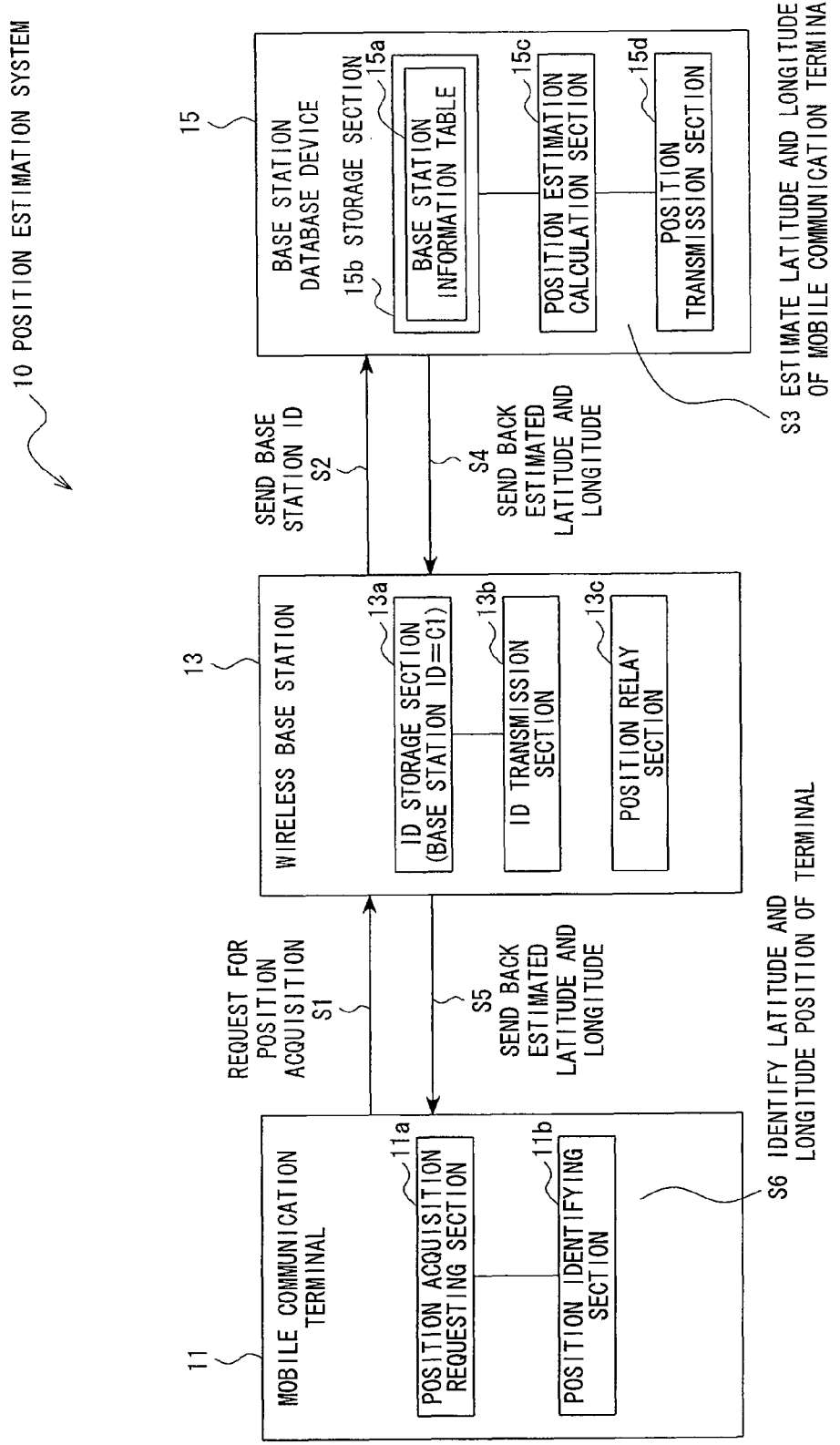

*FIG. 2A*

| BASE STATION ID | BASE STATION LATITUDE La1 | BASE STATION LONGITUDE Lo1 | TILT ANGLE θ | ANTENNA APERTURE ANGLE 2θ | ANTENNA DIRECTIVITY | ANTENNA HEIGHT h |
|---|---|---|---|---|---|---|
| C1 | 20.000 | 120.000 | 30° | 60° | 0° | 100m |

| BASE STATION ID | ESTIMATED LATITUDE LaM | ESTIMATED LONGITUDE LoM |
|---|---|---|
| C1 | 20° 00′ 03″ | 120° 00′ 00″ |

FIG. 8A

| BASE STATION ID | BASE STATION LATITUDE La1 | BASE STATION LONGITUDE Lo1 | TILT ANGLE $\theta$ | ANTENNA APERTURE ANGLE $2\theta$ | ANTENNA DIRECTIVITY | ANTENNA HEIGHT h |
|---|---|---|---|---|---|---|
| C1 | 20.000 | 120.000 | 30° | 60° | 0° | 100m |
| C2 | 25.000 | 150.000 | 30° | 60° | 180° | 100m |

| BASE STATION ID | ESTIMATED LATITUDE LaM | ESTIMATED LONGITUDE LoM |
|---|---|---|
| C1 | 20° 00′ 03″ | 120° 00′ 00″ |
| C2 | 24° 59′ 57″ | 150° 00′ 00″ |

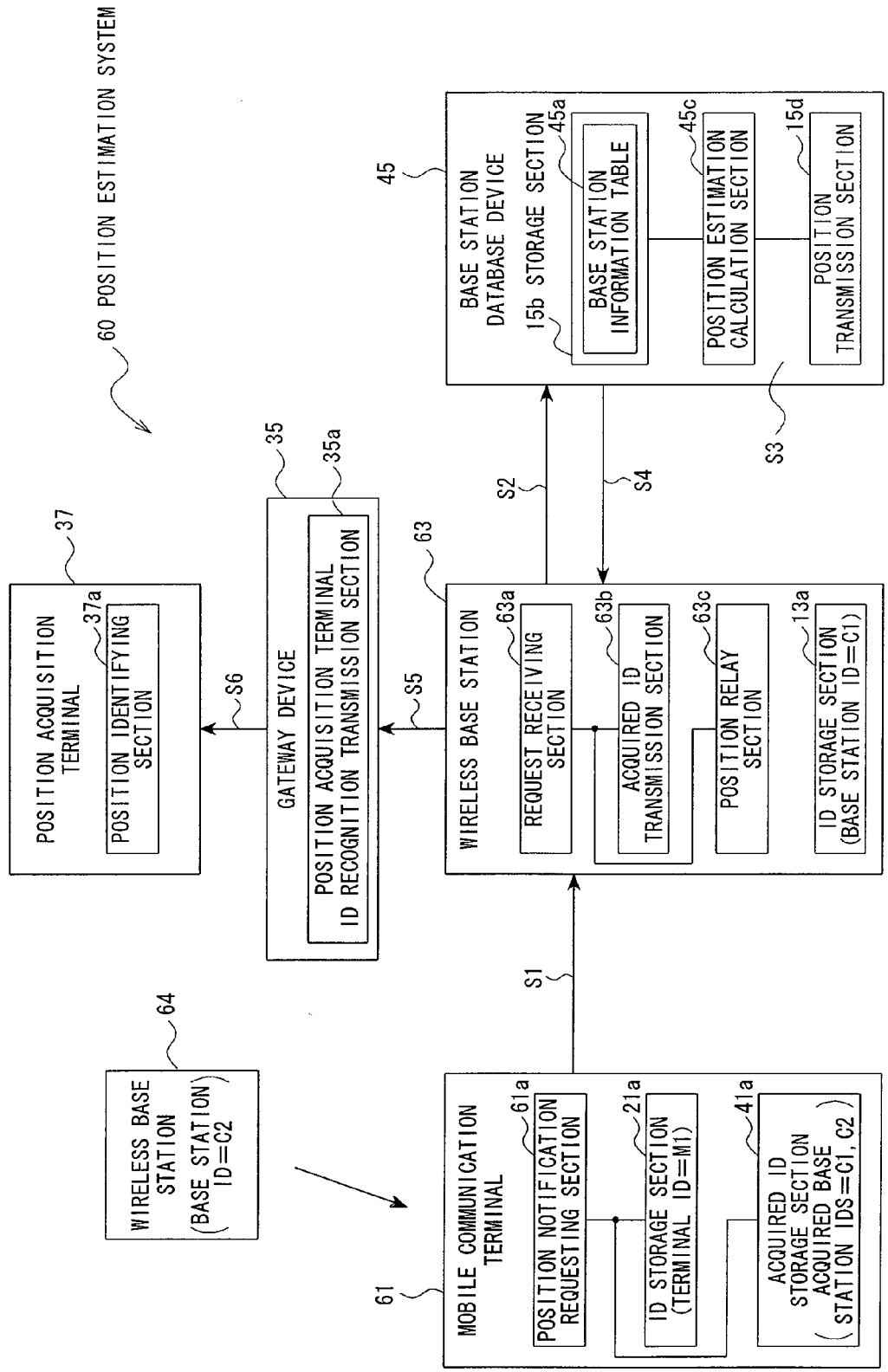

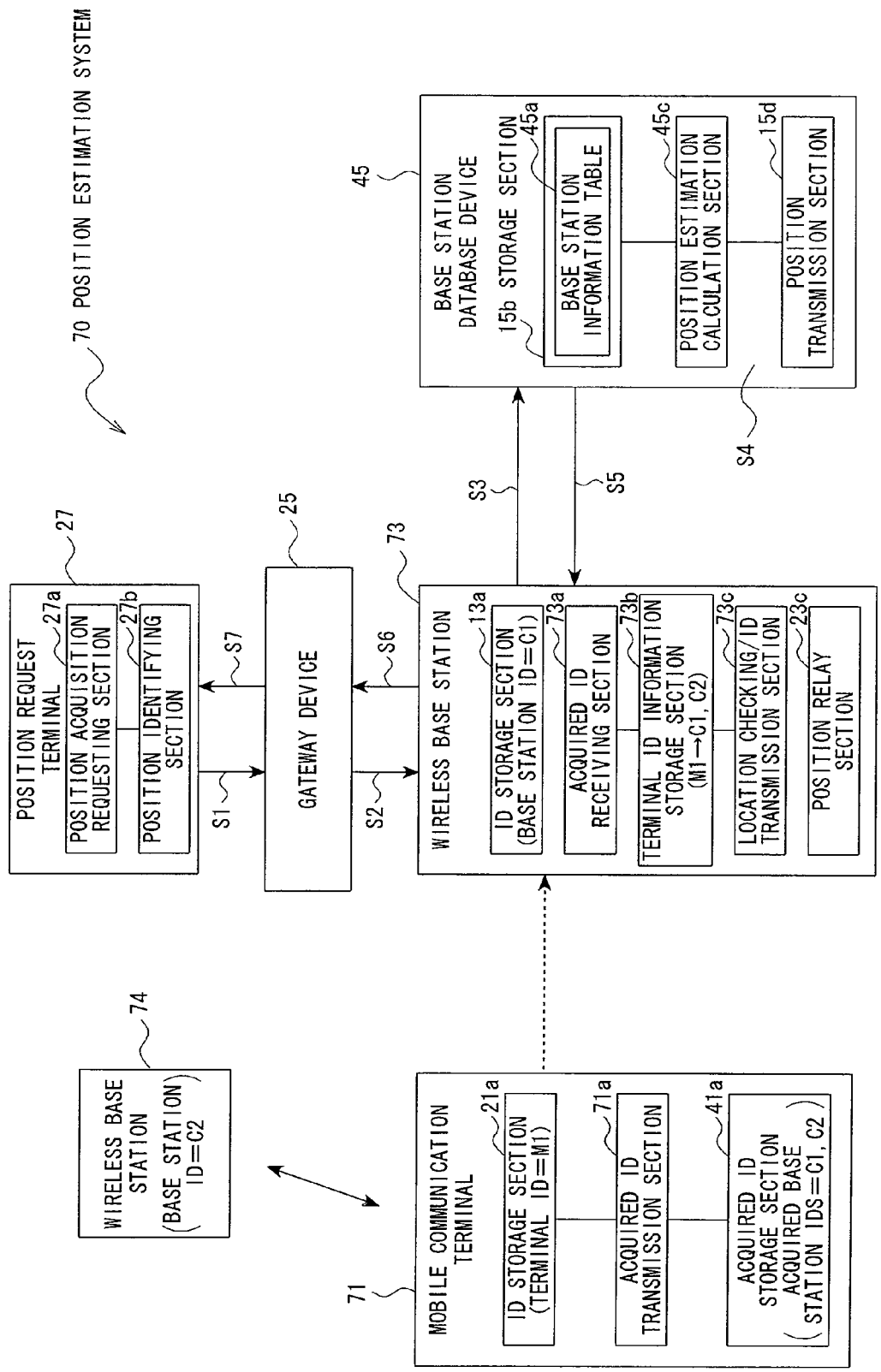

*F I G. 1 2*

| BASE STATION ID | PRIORITY LEVEL | ESTIMATED LATITUDE LaM | ESTIMATED LONGITUDE LoM |
|---|---|---|---|
| C1 | 0 | 20° 00′ 03″ | 120° 00′ 00″ |
| C2 | 1 | 24° 59′ 57″ | 150° 00′ 00″ |

FIG.13

| BASE STATION ID | EXCEPTION FLAG | BASE STATION LATITUDE La1 | BASE STATION LONGITUDE Lo1 | TILT ANGLE θ | ANTENNA APERTURE ANGLE 2θ | ANTENNA DIRECTIVITY | ANTENNA HEIGHT h |
|---|---|---|---|---|---|---|---|
| C1 | 0 | 20.000 | 120.000 | 30° | 60° | 0° | 100m |
| C2 | 1 | 25.000 | 150.000 | 30° | 60° | 180° | 100m |

FIG.14

| BASE STATION ID | BASE STATION LATITUDE La1 | BASE STATION LONGITUDE Lo1 | TILT ANGLE θ | ANTENNA APERTURE ANGLE 2θ | ANTENNA DIRECTIVITY | ANTENNA HEIGHT h |
|---|---|---|---|---|---|---|
| C1 | 20.000 | 120.000 | 30° | 60° | 0° | 100m |
| C2 | 25.000 | 150.000 | 0° | 60° | 180° | 100m |

POSITION ESTIMATION SYSTEM

BACKGROUND OF THE INVENTION

1. Field of the Invention

The present invention relates to a position estimation system which estimates a position of a mobile communication terminal such as a cellular phone based on information received from a wireless base station in an environment where the mobile communication terminal cannot communicate with a GPS (Global Positioning System).

2. Description of the Related Art

Conventionally, there is a technology for a mobile communication terminal whose transmission method is W-CDMA (Wideband-Code Division Multiple Access) to estimate its own position through communication with a wireless base station in an environment where the terminal cannot communicate with a GPS.

For example, as described in JP 2006-33207A, the wireless base station stores a transmission time, calculates an RTT (Round Trip Time) using a received signal from the mobile station, and calculates a distance from a calculated time stamp. Then, after completing demodulation of DPCCH (Dedicated Physical Control Channel), the wireless base station calculates a fading correlation value using a channel estimation value, performs rate calculation processing, and performs processing of estimating a moving direction from the ration between "0" and "1" in a bit sequence. Further, after the wireless base station estimates a distance, a speed, and the moving direction, the station determines an optimal position information that is to be sent to the mobile station using a table for determining transmission position information. Thus, as a technology in a broader concept, a wireless base station is allowed to estimate position information to be provided to a mobile communication terminal in the range of area in a sector.

JP 2006-33207A also describes that a wireless base station estimates to determine which sector a mobile communication terminal exists, in a radio area of a wireless base station. However, since position estimation can be performed just in units of sector areas and thus is fairly rough, there is a problem that more accurate position estimation such as positioning in latitude and longitude cannot be performed.

SUMMARY OF THE INVENTION

The present invention has been made in view of the above-described problem and it is an object of the present invention to provide a position estimation system, whereby the position of a mobile communication terminal can be estimated in a more accurate manner in an environment where the terminal cannot communicate with a GPS, by defining the position more narrowly than a sector area of a wireless base station in which the mobile communication terminal is located.

To achieve the above-described object, a position estimation system according a first aspect of the present invention comprises: a mobile communication terminal; a base station which wirelessly communicates with the mobile communication terminal and which holds its own base station ID that is unique information; and a database device which holds an information table having base station information including a latitude, a longitude, a tilt angle, an antenna aperture angle, antenna directivity, and an antenna height of the base station which are associated with the base station ID, wherein the position estimation system estimates a position of the mobile communication terminal located in a radio area of the base station by using the database device, wherein the base station comprises: an ID transmission section for sending the base station ID to the database device when the mobile communication terminal requests acquisition of the position; and a relay section for relaying information of an estimated latitude and longitude of the mobile communication terminal which is sent from the database device to the mobile communication terminal requesting the acquisition of the position, wherein the database device comprises: a calculating section for performing processing for reading the base station information associated with the base station ID from the information table when the base station ID is received, obtaining a latitude and a longitude of a center of a sector that is a gravity center of the sector in the radio area of the base station according to a predetermined calculation using the base station information, and determining the obtained latitude and longitude as the estimated latitude and longitude of the mobile communication terminal; and a position transmission section for sending the information of the estimated latitude and longitude of the mobile communication terminal obtained by the calculating section to the relevant base station, and wherein the mobile communication terminal identifies the relayed information of the estimated latitude and longitude of the mobile communication terminal as position information of the latitude and the longitude of the mobile communication terminal.

According to this configuration, even if the mobile communication terminal is in an environment where the terminal cannot communicate with a GPS, a latitude and longitude of the center of a sector of the base station in which the mobile communication terminal is located is obtained, and is estimated as the latitude and longitude of the mobile communication terminal, so that the position is defined more narrowly than a sector area that is a unit of estimation allowed by conventional position estimation and therefore the position of the mobile communication can be estimated more accurately.

In addition, a position estimation system according a second aspect of the present invention comprises: a position request terminal which specifies a terminal ID of any mobile communication terminal and which requests acquisition of a position of the relevant mobile communication terminal; a mobile communication terminal which holds its own terminal ID that is unique information; a base station which wirelessly communicates with the mobile communication terminal as well as communicates with the position request terminal via a relay server, and which holds its own base station ID that is unique information; and a database device which holds an information table having base station information including a latitude, a longitude, a tilt angle, an antenna aperture angle, an antenna directivity, and an antenna height of the base station which are associated with the base station ID, the position estimation system estimating the position of the mobile communication terminal located in a radio area of the base station by the database device when the acquisition of the position is requested, wherein the base station comprises: a request transmission section for, when position acquisition request information including the terminal ID at a time when the acquisition of the position is requested is received, sending the information to the mobile communication terminal; an ID transmission section for sending the base station ID to the database device when a response signal is received from the mobile communication terminal in response to the request for the acquisition of the position sent by the request transmission section; and a relay section for relaying information of an estimated latitude and longitude of the mobile communication terminal which is sent from the database device to the request terminal requesting the acquisition of the position, wherein the mobile communication terminal comprises an acknowledgement section for sending back the response signal to the base station which has sent the request for the acquisition of the position if the terminal ID included in the position acquisition request information received from the base station is identical to the terminal ID held by the mobile communication terminal, wherein the database device comprises: a calculating section for performing processing for reading the base station information associated with the base station ID from the information table when the base station ID is received, obtaining a latitude, a longitude of a center of a sector that is a gravity center of the sector in the radio area of the base station according to a predetermined calculation using the base station information, and determining the obtained latitude and longitude as the estimated latitude and longitude of the mobile communication terminal; and a position transmission section for sending the information of the estimated latitude and longitude of the mobile communication terminal obtained by the calculating section to the base station, and wherein the request terminal identifies the relayed information of the estimated latitude and longitude of the mobile communication terminal as position information of the latitude and the longitude of the mobile communication terminal whose position is requested to be acquired.

According to this configuration, even if the mobile communication terminal whose position is to be detected is in an environment where the terminal cannot communicate with a GPS when a terminal ID such a telephone number is specified and a position of the relevant mobile communication terminal is acquired by the position request terminal, a latitude and longitude of the center of a sector of the base station in which the mobile communication terminal is located is obtained, and is estimated as the latitude and longitude of the mobile communication terminal, and this estimated latitude and longitude is sent back to the position request terminal. Thereby, the position is defined more narrowly than a sector area that is a unit of estimation allowed by conventional position estimation, and therefore the position of the mobile communication terminal can be estimated more accurately and notified to the position request terminal.

In addition, a position estimation system according a third aspect of the present invention comprises: a mobile communication terminal which holds its own terminal ID that is unique information; a base station which wirelessly communicates with the mobile communication terminal as well as communicates with a position acquisition terminal via a relay server, and which holds its own base station ID that is unique information; and a database device which holds an information table having base station information including a latitude, a longitude, a tilt angle, an antenna aperture angle, an antenna directivity, and an antenna height of the base station which are associated with the base station ID, the position estimation system estimating a position of the mobile communication terminal by using the database device when the mobile communication terminal notifies the position acquisition terminal of the position of the mobile communication terminal, wherein the mobile communication terminal comprises: a position notification requesting section for requesting to notify the position acquisition terminal of the position of the mobile communication terminal using position notification request information including a position acquisition terminal ID that is unique information of the position acquisition terminal and the terminal ID of the mobile communication terminal, wherein the base station comprises: an ID transmission section for sending the base station ID to the database device when the position notification request information is received; and a relay section for adding the position acquisition terminal ID and the terminal ID of the terminal requesting the position notification request to estimated latitude and longitude information of the mobile communication terminal sent from the database device and sending the estimated latitude and longitude information to the relay server, wherein the relay server comprises a recognition transmission section for recognizing the position acquisition terminal ID included in the estimated latitude and longitude information from the base station and sending the estimated latitude and longitude information to the position acquisition terminal having the recognized ID, wherein the database device comprises: a calculating section for performing processing for reading the base station information associated with the base station ID from the information table when the base station ID is received, obtaining a latitude, a longitude of a center of a sector that is a gravity center of the sector in a radio area of the base station according to a predetermined calculation using the base station information, and determining the obtained latitude and longitude as the estimated latitude and longitude of the mobile communication terminal; and a position transmission section for sending the information of the estimated latitude and longitude of the mobile communication terminal obtained by the calculating section to the base station, and wherein the position acquisition terminal identifies the estimated latitude and longitude information sent form the relay server as position information of the latitude and the longitude of the mobile communication terminal having the terminal ID of the terminal requesting the position notification request that is included in the estimated latitude and longitude information.

According to this configuration, even if the mobile communication terminal which is the source of the position notification is in an environment where the terminal cannot communicate with a GPS when the mobile communication terminal notifies the predetermined position acquisition terminal of a position of the mobile communication terminal, a latitude and longitude of the center of a sector of the base station in which the mobile communication terminal is located is obtained, and is estimated as the latitude and longitude of the mobile communication terminal, and this latitude and longitude is notified to the position acquisition terminal via the relay server. Thereby, the position is defined more narrowly than a sector area that is a unit of estimation allowed by conventional position estimation and therefore the position of the mobile communication terminal can be estimated more accurately and notified to the position acquisition terminal.

In addition, a position estimation system according to a fourth aspect of the present invention comprises: a base station which holds its own base station ID that is unique information; a mobile communication terminal which stores acquired base station IDs that are IDs of a plurality of base stations acquirable through wireless communication; and a database device which holds an information table having base station information including a latitude, a longitude, a tilt angle, an antenna aperture angle, an antenna directivity, and an antenna height of each base station which are associated with each respective base station ID, the position estimation system estimating a position of the mobile communication terminal located in a radio area of the base station by the database device, wherein the mobile communication terminal comprises an acquired ID transmission section for, in response to a request for acquisition of the acquired base station IDs sent from the base station in response to a request for acquisition of a position of the mobile communication terminal, sending the plurality of acquired base station IDs held by the mobile communication terminal to the base station requesting the acquisition of the acquired base station IDs, wherein the base station comprises: an acquired ID requesting section for requesting acquisition of the acquired base station IDs when the mobile communication terminal requests the acquisition of the position; an ID sending/receiving section for receiving the plurality of acquired base station IDs sent in response to the request for the acquisition request and sending the acquired base station IDs to the database device; and a relay section for relaying information of an estimated latitude and longitude of the mobile communication terminal which is sent from the database device to the mobile communication terminal requesting the acquisition of the position, wherein the database device comprises: a calculating section for performing processing for reading the base station information associated with each of the acquired base station IDs from the information table when the plurality of acquired base station IDs are received, obtaining a latitude, a longitude of a center of a sector that is a center of gravity of the sector in the radio area for each of the base stations having the respective acquired base station IDs according to a predetermined calculation using the base station information, and determining an average of the obtained latitudes and longitudes as the estimated latitude and longitude of the mobile communication terminal; and a position transmission section for sending the information of the estimated latitude and longitude of the mobile communication terminal obtained by the calculating section to the relevant base station, and wherein the mobile communication terminal identifies the relayed information of the estimated latitude and longitude of the mobile communication terminal as position information of a latitude and a longitude of the mobile communication terminal.

According to this configuration, even if the mobile communication terminal is in an environment where the terminal cannot communicate with a GPS, a latitude and longitude of a center of a sector for each of a plurality of base stations in which the mobile communication terminal is located is obtained, and an average of these latitudes and longitudes is estimated as a latitude and longitude of the mobile communication terminal, so that the position of the terminal can be further accurately estimated compared to estimation from one base station.

In addition, a position estimation system according to a fifth aspect of the present invention comprises: a position request terminal which specifies a terminal ID of any mobile communication terminal and requests acquisition of a position of the relevant mobile communication terminal; a base station which communicates with the position request terminal via a relay server and holds its own base station ID that is unique information; a mobile communication terminal which stores acquired base station IDs that are IDs of a plurality of base station acquirable through wireless communication; and a database device which holds an information table having base station information including a latitude, a longitude, a tilt angle, an antenna aperture angle, an antenna directivity, and an antenna height of each base station which are associated with each respective base station ID, the position estimation system estimating the position of the mobile communication terminal located in a radio area of the base station by the database device when the acquisition of the position is requested, wherein the base station comprises: a request transmission section for, when position acquisition request information including the terminal ID at a time when the acquisition of the position is requested is received, sending the information to the mobile communication terminal; an ID sending/receiving section for receiving the plurality of acquired base station IDs from the mobile communication terminal in response to the request for the acquisition of the position sent by the request transmission section and sending the plurality of acquired base station IDs to the database device; and a relay section for relaying information of an estimated latitude and longitude of the mobile communication terminal which is sent from the database device to the request terminal requesting the acquisition of the position, wherein the mobile communication terminal comprises a check/transmission section for sending the plurality of acquired base station IDs held by the mobile communication terminal to the base station which has sent the position acquisition request information if the terminal ID included in the position acquisition request information received from the base station is identical to the terminal ID held by the mobile communication terminal, wherein the database device comprises: a calculating section for performing processing for reading the base station information associated with each of the acquired base station IDs from the information table when the plurality of acquired base station IDs are received, obtaining a latitude and a longitude of a center of a sector that is a gravity center of the sector in the radio area for each of the base stations having the respective acquired base station IDs according to a predetermined calculation using the base station information, and determining an average of the obtained latitudes and longitudes as the estimated latitude and longitude of the mobile communication terminal; and a position transmission section for sending the information of the estimated latitude and longitude of the mobile communication terminal obtained by the calculating section to the relevant base station, and wherein the request terminal identifies the relayed information of the estimated latitude and longitude of the mobile communication terminal as position information of a latitude and a longitude of the mobile communication terminal whose position is requested to be acquired.

According to this configuration, even if the mobile communication terminal is in an environment where the terminal cannot communicate with a GPS when a terminal ID such as a telephone number is specified and a position of the relevant mobile communication terminal is acquired by the position request terminal, a latitude and longitude of a center of a sector for each of a plurality of base stations in which the mobile communication terminal is located is obtained, and an average of these latitudes and longitudes is estimated as a latitude and longitude of the mobile communication terminal, and this estimated latitude and longitude is sent back to the position request terminal. Thereby, the position of the terminal can be further accurately estimated compared to estimation from just one base station and can be notified to the position request terminal.

In addition, a position estimation system according to a sixth aspect of the present invention comprises: a mobile communication terminal which stores its own terminal ID which is unique information and acquired base station IDs which are IDs of a plurality of base stations acquirable through wireless communication; a base station which wirelessly communicates with the mobile communication terminal as well as communicates with a position acquisition terminal via a relay server; and a database device which holds an information table having base station information including a latitude, a longitude, a tilt angle, an antenna aperture angle, an antenna directivity, and an antenna height of each base station which are associated with each respective base station ID, the position estimation system estimating a position of the mobile communication terminal by the database device when the mobile communication terminal notifies the position acquisition terminal of the position of the mobile communication terminal, wherein the mobile communication terminal comprises a position notification requesting section for requesting to notify the position acquisition terminal of the position of the mobile communication terminal using position notification request information including a position acquisition terminal ID that is unique information of the position acquisition terminal, the acquired base station IDs, and the terminal ID of the mobile communication terminal, wherein the base station comprises a request receiving section for receiving the position notification request information and obtains the acquired base station IDs, the position acquisition terminal ID, and the terminal ID in the information; an ID sending/receiving section for sending the acquired base station IDs obtained by the request receiving section to the database device; and a relay section for adding the position acquisition terminal ID and terminal ID obtained by the request receiving section to estimated latitude and longitude information of the mobile communication terminal sent from the database device and sending the estimated latitude and longitude information to the relay server, wherein the relay server comprises a recognition transmission section for recognizing the position acquisition terminal ID included in the estimated latitude and longitude information from the base station and sending the estimated latitude and longitude information to the position acquisition terminal having the recognized ID, wherein the database device comprises: a calculating section for performing processing for reading the base station information associated with each of the acquired base station IDs from the information table when the plurality of acquired base station IDs are received, obtaining a latitude, a longitude of a center of a sector that is a gravity center of the sector in the radio area for each of the base stations having the respective acquired base station IDs according to a predetermined calculation using the base station information, and determining an average of the obtained latitudes and longitudes as the estimated latitude and longitude of the mobile communication terminal; and a position transmission section for sending the information of the estimated latitude and longitude of the mobile communication terminal obtained by the calculating section to the relevant base station, and wherein the position acquisition terminal identifies the estimated latitude and longitude information sent form the relay server as position information of a latitude and a longitude of the mobile communication terminal having the terminal ID of the terminal requesting the position notification request that is included in the estimated latitude and longitude information.

According to the this configuration, even if the mobile communication terminal which is the source of the position notification is in an environment where the terminal cannot communicate with a GPS when the mobile communication terminal notifies the predetermined position acquisition terminal of a position of the mobile communication terminal, a latitude and longitude of a center of a sector for each of a plurality of base stations in which the mobile communication terminal is located is obtained, and an average of these latitudes and longitudes is estimated as a latitude and longitude of the mobile communication terminal, and this latitude and longitude is notified to the position acquisition terminal. Thereby, the position of the terminal can be further accurately estimated compared to estimation from just one base station and can be notified to the position acquisition terminal.

In addition, a position estimation system according to a seventh aspect of the present invention comprises: a position request terminal which specifies a terminal ID of any mobile communication terminal and requests acquisition of a position of the relevant mobile communication terminal; a base station which communicates with the position request terminal via a relay server and holds its own base station ID that is unique information; a mobile communication terminal which stores acquired base station IDs that are IDs of a plurality of base stations acquirable through wireless communication; and a database device which holds an information table having base station information including a latitude, a longitude, a tilt angle, an antenna aperture angle, an antenna directivity, and an antenna height of each base station which are associated with each respective base station ID, the position estimation system estimating the position of the mobile communication terminal located in a radio area of the base station by the database device when the acquisition of the position is requested, wherein the mobile communication terminal comprises an acquired ID transmission section for sending its own terminal ID associated with the acquired base station IDs to the relevant base station when the mobile communication terminal is located in the radio area of the base station, wherein the base station comprises: an acquired ID receiving section for receiving the acquired base station IDs paired with the terminal ID from the mobile communication terminal; a terminal ID information storage section for storing the received acquired base station IDs paired with the terminal ID; a location checking/ID transmission section for, when position acquisition request information including the terminal ID at a time when the acquisition of the position is requested is received, if the mobile communication terminal having the relevant terminal ID is located in the area of the base station, sending the acquired base station IDs paired with the relevant terminal ID stored by the terminal ID information storage section to the database device; and a relay section for relaying information of an estimated latitude and longitude of the mobile communication terminal which is sent from the database device to the request terminal requesting the acquisition of the position, wherein the database device comprises: a calculating section for performing processing for reading the base station information associated with each of the acquired base station IDs from the information table when the plurality of acquired base station IDs are received, obtaining a latitude, a longitude of a center of a sector that is a gravity center of the sector in the radio area for each of the base stations having the respective acquired base station IDs according to a predetermined calculation using the base station information, and determining an average of the obtained latitudes and longitudes as the estimated latitude and longitude of the mobile communication terminal; and a position transmission section for sending the information of the estimated latitude and longitude of the mobile communication terminal obtained by the calculating section to the relevant base station, and wherein the request terminal identifies the relayed information of the estimated latitude and longitude of the mobile communication terminal as position information of the latitude and longitude of the mobile communication terminal whose position is requested to be acquired.

According to the this configuration, if a terminal ID specified by the position request terminal is notified to a base station, and a mobile communication terminal having the specified terminal ID is located in a radio area of this base station, it is allowed that, even though the relevant base station is in communication with another base station, a latitude and longitude of a center of a sector for each of a plurality of base stations in which the mobile communication terminal is located is obtained, an average of these latitudes and longitudes is estimated as a latitude and longitude of the mobile communication terminal, and this estimated latitude and longitude is sent back to the position request terminal.

In addition, in the above-described configuration, for obtaining the latitude and longitude of the center of the sector, the calculating section may perform calculation for obtaining a cell radius of the radio area of the base station using information of the tilt angle and the antenna height from the base station information, obtaining position coordinates of the center of the sector after obtaining a distance between the base station and the center of the sector using information of the cell radius, the antenna directivity, and the antenna aperture angle, converting the distance from the base station to the center of the sector that can be obtained on the basis of the position coordinates, into latitude and longitude, and obtaining the latitude and the longitude of the center of the sector using the converted latitude and longitude and the information of the latitude and longitude of the base station.

According to this configuration, a latitude and longitude of the center of a sector of the base station can be obtained by calculation using respective base station information of a latitude and longitude, a tilt angle, an antenna aperture angle, an antenna directivity, and an antenna height of the base station which are generally held in a table format in the base station database device, so that latitude and longitude estimation calculation processing can be provided at low cost.

In addition, in the above-described configuration, each base station ID of the information table may be associated with a priority level, and the calculating section performs processing for obtaining the latitude and longitude of the center of the sector for each of the base stations and then determining the latitude and longitude of the center of the sector of the base station having a base station ID which is higher in the priority level as the estimated latitude and longitude of the mobile communication terminal.

According to this configuration, in a case where a base station is placed in a building, and radio waves from an external base station reaches inside the building, the priority level of the internal base station's ID is set higher than that of the external base station's ID because a mobile communication terminal located in radio areas of both base stations is closer to the internal base station. Thus, when the mobile communication terminal in the building is located in radio areas of both the internal and external base stations, a latitude and longitude of the center of a sector of the base station having higher priority level in the building is used, and thereby the position of the mobile communication terminal can be identified more accurately.

In addition, in the above-described configuration, each base station ID of the information table may be associated with an exception flag which represents a wireless base station in a narrow area where a plurality of wireless base stations are installed, and the calculating section is not allowed to perform calculation to obtain the latitude and the longitude of the center of the sector of the base station having the base station ID that is associated with the exception flag.

According to this configuration, calculation of a latitude and longitude of the center of a sector of a base station is not performed with respect to a base station with the exception flag on, and therefore latitude and longitude calculation is performed only with respect to a base station with the exception flag off. For example, when the exception flag is set on in the case where a plurality of base stations are equipped in a narrow area such as inside a building, calculation of a position based on radio waves from them is not allowed since the plurality of base stations are installed in the narrow area. Thus, calculation is not performed with respect to a base station with the exception flag on, and a latitude and longitude of the center of a sector of a base station whose exception flag is off is obtained and determined as the latitude and longitude of a mobile communication terminal, so that the estimated latitude and longitude position of a mobile communication terminal can be properly obtained.

In addition, in the above-described configuration, the calculating section may not be allowed to perform calculation to obtain the latitude and the longitude of the center of the sector of the base station having a base station ID associated with the tilt angle if the tilt angle is zero degrees.

According to this configuration, since a latitude and longitude of the center of a sector of a base station cannot be calculated if the tilt angle is zero degrees, latitude and longitude estimation calculation is not performed with respect to a base station whose tilt angle is zero degrees, and latitude and longitude estimation calculation is performed with respect to only a base station whose tilt angle is not zero degrees, so that the estimated latitude and longitude position of a mobile communication terminal can be properly obtained.

In addition, in the above-described configuration, the calculating section may obtain the latitude and longitude of the center of the sector of the base station having the base station ID that is not associated with the exception flag or the tilt angle of zero degrees, and when the obtained latitude and longitude is determined as the estimated latitude and longitude of the mobile communication terminal, adds an error on a random basis to the estimated latitude and longitude.

According to this configuration, since an error is added to estimated latitude and longitude information to be wirelessly transmitted to a mobile communication terminal, the information can be prevented from being recognized by other terminals.

In addition, in the above-described configuration, the database device may comprise, instead of the calculating section, a second calculating section for performing processing for reading the latitudes and the longitudes of the respective base stations in the base station information associated with the respective acquired base station IDs from the information table when the plurality of acquired base station IDs are received, and determining an average of the latitudes and longitudes of the base stations as the estimated latitude and longitude of the mobile communication terminal, and wherein the position transmission section sends information of the estimated latitude and longitude of the mobile communication terminal obtained by the second calculating section to the relevant base station.

According to this configuration, even if the mobile communication terminal is in an environment where the terminal cannot communicate with a GPS, an average of the latitudes and longitudes of a plurality of base stations having areas in which the mobile communication terminal is located is obtained, and is estimated as a latitude and longitude of the mobile communication terminal, so that the position of the terminal can be more accurately estimated compared to estimation from the information of the latitude and longitude of one base station.

In addition, in the above-described configuration, the database device may further comprise a map database section for storing map information in which an exceptional location is defined, and wherein, after obtaining the estimated latitude and longitude of the mobile communication terminal, the calculating section or the second calculating section performs processing for deleting information of the estimated latitude and longitude if the estimated latitude and longitude corresponds to the exceptional location in the map information of the map database section.

According to this configuration, if an estimated latitude and longitude of a mobile communication terminal that has been once obtained by the calculating means is determined to be on the exceptional location such as the sea while the mobile communication terminal exists on land, information of the estimated latitude and longitude is not sent to the mobile communication terminal, so that false estimated latitude and longitude can be prevented from being sent to the mobile communication terminal.

As described above, according to the present invention, there is an advantage that a position of a mobile communication terminal in an environment where the terminal cannot communicate with a GPS is defined more narrowly than a sector area of a wireless base station in which the mobile communication terminal is located so that the position of the mobile communication terminal can be estimated more accurately.

BRIEF DESCRIPTION OF THE DRAWINGS

FIG. 1 is a block diagram which shows a configuration of a position estimation system according to a first embodiment of the present invention;

FIG. 2A is a diagram which shows a base station information table of base station information associated with one base station ID;

FIG. 2B is a diagram which shows an estimated latitude and longitude associated with one base station ID;

FIG. 8A is a diagram which shows a base station information table of two sets of base station information respectively associated with two base station IDs;

FIG. 8B is a diagram which shows two sets of estimated latitude and longitude respectively associated with two base station IDs;

FIG. 10 is a block diagram which shows a configuration of a position estimation system according to a sixth embodiment of the present invention;

FIG. 11 is a block diagram which shows a configuration of a position estimation system according to a seventh embodiment of the present invention;

FIG. 12 is a diagram which shows priority levels respectively associated with two base station IDs;

FIG. 13 is a diagram which shows a base station information table in which exception flags are associated with two base station IDs respectively;

FIG. 14 is a diagram which shows a base station information table in which a tilt angle θ associated with one of base station IDs is zero degrees.

DETAILED DESCRIPTION OF THE PREFERRED EMBODIMENTS

Figure 3:
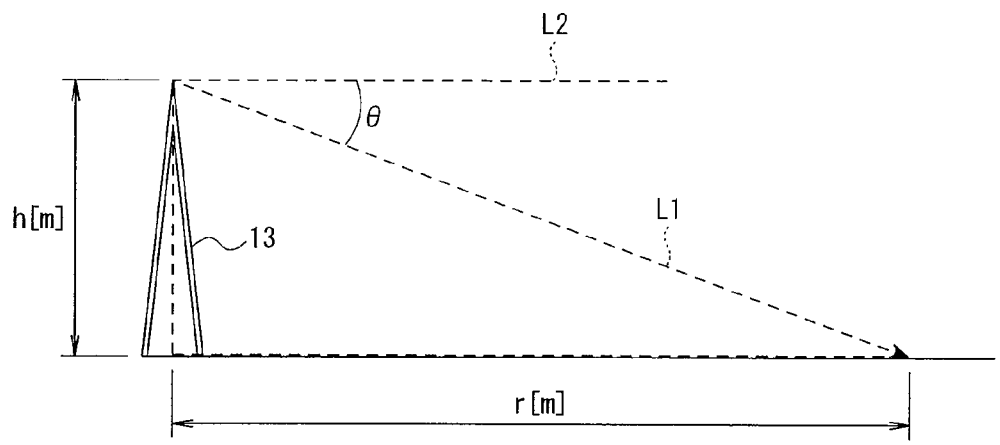
FIG. 3 is a diagram which shows an antenna height h, a tilt angle θ, and a cell radius r of a base station.

Hereinafter, embodiments of the present invention will be described with reference to the drawings. The same or corresponding parts are denoted by the same reference numerals throughout the drawings, and descriptions thereof may be omitted in a suitable manner to avoid overlaps.

First Embodiment

FIG. 1 is a block diagram which shows a configuration of a position estimation system according to a first embodiment of the present invention.

A position estimation system 10 of a first embodiment shown in FIG. 1 is a system based on a W-CDMA mobile communication system, and comprises: a mobile communication terminal 11 such as a cellular phone; a wireless base station 13 connected to the mobile communication terminal 11 through wireless communication; and a base station database device 15 having a server function which is connected to the wireless base station 13 through wireless or wire communication. This system is characterized in that a position of the mobile communication terminal 11 in an environment where the terminal cannot communicate with a GPS (not shown) can be estimated such that the position is defined more narrowly than a sector area of the wireless base station 13 in which the mobile communication terminal 11 is located. A configuration for this position estimation will next be described.

The mobile communication terminal 11 comprises: a position acquisition requesting section 11a which requests acquisition of a position of the terminal 11 to the wireless base station 13 having an area in which the terminal 11 is located through wireless communication of a communication section (not shown); and a position identifying section 11b which identifies information of estimated latitude and longitude sent back from the wireless base station 13 in response to the position acquisition request, as the position of the terminal 11.

The wireless base station 13 comprises an ID storage section 13a which stores its own base station ID (Identification), an ID transmission section 13b which sends the base station ID to the base station database device 15 when the position acquisition request is received from the mobile communication terminal 11, and a position relay section 13c which relays the information of estimated latitude and longitude sent back from the base station database device 15 to the mobile communication terminal 11.

The wireless base station 13 corresponds to an antenna, an access point of a wireless LAN (Local Area Network), or the like, and the base station ID corresponds to an antenna ID, a MAC (Media Access Control) address, or the like. In this example, a base station ID of the wireless base station 13 is defined as C1.

The base station database device 15 comprises: a storage section 15b which stores a base station information table 15a in which information of the wireless base station is associated with a base station ID, a position estimation calculation section 15c; and position transmission section 15d.

As shown in FIG. 2A, the base station information table 15a is configured such that base station latitude La1, base station longitude Lo1, tilt angle θ, antenna aperture angle 2θ, antenna directivity, and antenna height h are associated with the base station ID. In this example, the table is the base station information table 15a of the wireless base station 13 in which base station latitude La1=20.000, base station longitude Lo1=120.000, tilt angle θ=30°, antenna aperture angle 2θ=60°, antenna directivity=0°, and antenna height h=100 m are associated with the base station ID=C1.

As shown in one example of FIG. 3, the tilt angle θ is an angle between a line L1 and a line L2, the line L1 running in a direction of a main beam that is directed upwardly or downwardly at a predetermined angle from the top of the antenna of the wireless base station 13 toward the ground, the line L2 extending from the top of the antenna of the wireless base station 13 in parallel with the ground. As shown in one example of FIG. 4, the antenna aperture angle 2θ is double the tilt angle θ.

The position estimation calculation section 15c reads out from the base station information table 15a various types of information associated with base station ID=C1 from the wireless base station 13 to which the position acquisition request is sent from the mobile communication terminal 11. Then, based on the information of base station latitude La1=20.000, base station longitude Lo1=120.000, tilt angle θ=30°, antenna aperture angle 2θ=60°, antenna directivity=0°, and antenna height h=100 m, the position estimation calculation section 15c calculates a latitude and a longitude of the center of a sector in a fan-like shape (the gravity center of the fan-like sector) of the wireless base station 13 in which the mobile communication terminal 11 whose position is to be estimated is located, according to the calculation to be described later, and determines this latitude and longitude of the center of the sector as an estimated position (estimated latitude and longitude) of the mobile communication terminal 11.

The position transmission section 15d sends the position information of the latitude and longitude estimated by the position estimation calculation section 15c to the wireless base station 13 having the base station ID used for calculating this information.

The latitude and longitude estimation calculation processing will now be described in detail, in which the latitude and longitude of the center of a sector are obtained by the position estimation calculation section 15c, and are determined to be estimated latitude and longitude of the mobile communication terminal 11.

First, the radius of a cell r[m] is obtained, where the cell is a radio area of the wireless base station 13 shown in FIG. 3. Since tilt angle θ=30° and antenna height h=100 m in the wireless base station 13, cell radius r is about 173 m. This is a length of two sides which extend from the center in a fan-like form in the sector.

Subsequently, referring to FIG. 4, a direction of the sector center S is obtained from the antenna directivity of the wireless base station 13. A distance g[m] between the wireless base station 13 and the sector center S is obtained by the following equation (1):

$$G=(2/3)(r \sin \theta/\theta) \ldots \quad (1)$$

Figure 4:
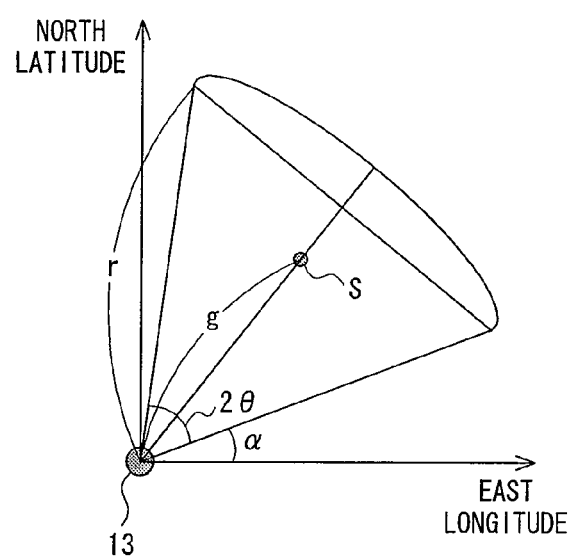
FIG. 4 is a diagram which shows latitude (north latitude) and longitude (east longitude) axes, a sector center S of a base station, a distance g between the base station and the sector center S, an angle α between a latitude or longitude axis and one side of the sector.

Then, coordinates P of the sector center S are obtained by the following equation (2):

$$P=\{g \cdot \cos(\alpha+\theta), g \cdot \sin(\alpha+\theta)\} \ldots \quad (2),$$

where α is an angle between an axis of latitude or longitude and one side of the sector as illustrated in FIG. 4.

From the equation (2), the sector center S is determined to be positioned at g·cos(α+θ) [m] to the east and g·sin(α+θ) [m] to the north of the wireless base station 13.

It is assumed here that this distance is converted into latitude and longitude (in units of seconds) and thereby latitude=30.83 m and longitude=25.28 m are obtained. However, there is an error of about 5 m in longitude around Japan. For example, it becomes about 22.6 m at Sapporo, about 25.28 m at Tokyo, 27.8 m at Naha, respectively. There is no substantial error in the latitude.

Using this result, the latitude and longitude (LaS, Los) of the sector center S is obtained as the following equation (3):

$$(LaS, Los)=\{La1+g \cdot \cos(\alpha+\theta)/30.83, Lo1+g \cdot \sin(\alpha+\theta)/25.28\} \ldots \quad (3)$$

Latitude and longitude (LaS, Los) of the sector center S obtained from the equation (3) is estimated latitude LaM=20°00'03", estimated longitude LoM=120°00'00" of the mobile communication terminal 11 as shown in FIG. 2B. The estimated latitude and longitude (LaM, LoM) of the mobile communication terminal 11 is associated with the relevant base station ID=C1.

There will be described with reference to FIG. 1 the processing operation by the position estimation system 10 in the above described configuration, in which a latitude and longitude position of the mobile communication terminal 11 in the environment where the terminal cannot communicate with the GPS is estimated.

First, in step S1, the mobile communication terminal 11 issues a position acquisition request by using the position acquisition requesting section 11a to the wireless base station 13 having an area in which the terminal is located. Upon receiving this position acquisition request, the wireless base station 13 sends its own base station ID=C1 to the base station database device 15 by the ID transmission section 13b in step S2.

Upon receiving the base station ID=C1, the base station database device 15 reads in information associated with the received base station ID=C1 which is required for latitude and longitude estimation calculation from the base station information table 15a and performs the latitude and longitude estimation calculation processing by the position estimation calculation section 15c in step S3.

Specifically, the position estimation calculation section 15c reads in base station latitude Lo1=20.000, base station longitude La1=120.000, tilt angle θ=30°, antenna aperture angle 2θ=60°, antenna directivity=0°, and antenna height h=100 m which are associated with the base station ID=C1, assigns the above values into the equations (1) to (3) to perform calculation thereby obtaining the latitude and longitude (Las, Los) of the sector center S of the wireless base station 13 in which the mobile communication terminal 11 is located, and determines the obtained latitude and longitude as estimated latitude and longitude (LaM, LoM) of the mobile communication terminal 11. In this example, the estimated latitude and longitude (LaM, LoM) is determined as (20°00'03", 120°00'00").

Then, in step S4, the base station database device 15 sends back information of the estimated latitude and longitude (LaM, LoM)=(20°00'03", 120°00'00") to the wireless base station 13 having the base station ID corresponding to the information by the position transmission section 15d. Upon receiving the information of the estimated latitude and longitude (LaM, LoM)=(20°00'03", 120°00'00"), the wireless base station 13 sends back the information by the position relay section 13c to the mobile communication terminal 11 requesting the acquisition of the position in step S5.

When the mobile communication terminal 11 receives the information of the estimated latitude and longitude (LaM, LoM)=(20°00'03", 120°00'00"), it identifies the received information, that is, the estimated latitude and longitude (LaM, LoM)=(20°00'03", 120°00'00") as the position of the mobile communication terminal 11 by the position identifying section 11b. The identified latitude and longitude is outputted, for example, by a display (not shown) or as sound so that a user of the mobile communication terminal 11 can recognize the latitude and longitude.

As described above, according to the position estimation system 10 of the first embodiment, even if the mobile communication terminal 11 is in an environment where the terminal 11 cannot communicate with a GPS, the latitude and longitude of the sector center of the wireless base station 13 in which the mobile communication terminal 11 is located are obtained to be estimated as the latitude and longitude of the mobile communication terminal 11. This allows the position to be defined more narrowly than a sector area that is the unit of estimation made available by the conventional position estimation. Therefore, the position can be estimated in a more accurate manner.

In addition, a latitude and longitude of the center of a sector of the wireless base station 13 can be obtained by calculation using respective base station information of base station latitude La1, base station longitude Lo1, tilt angle θ, antenna aperture angle 2θ, antenna directivity, and antenna height h that are associated with the base station ID and generally held in a table format in the base station database device 15, so that the latitude and longitude estimation calculation section 15c for performing the latitude and longitude estimation calculation processing can be provided at low cost.

Second Embodiment

Figure 5:
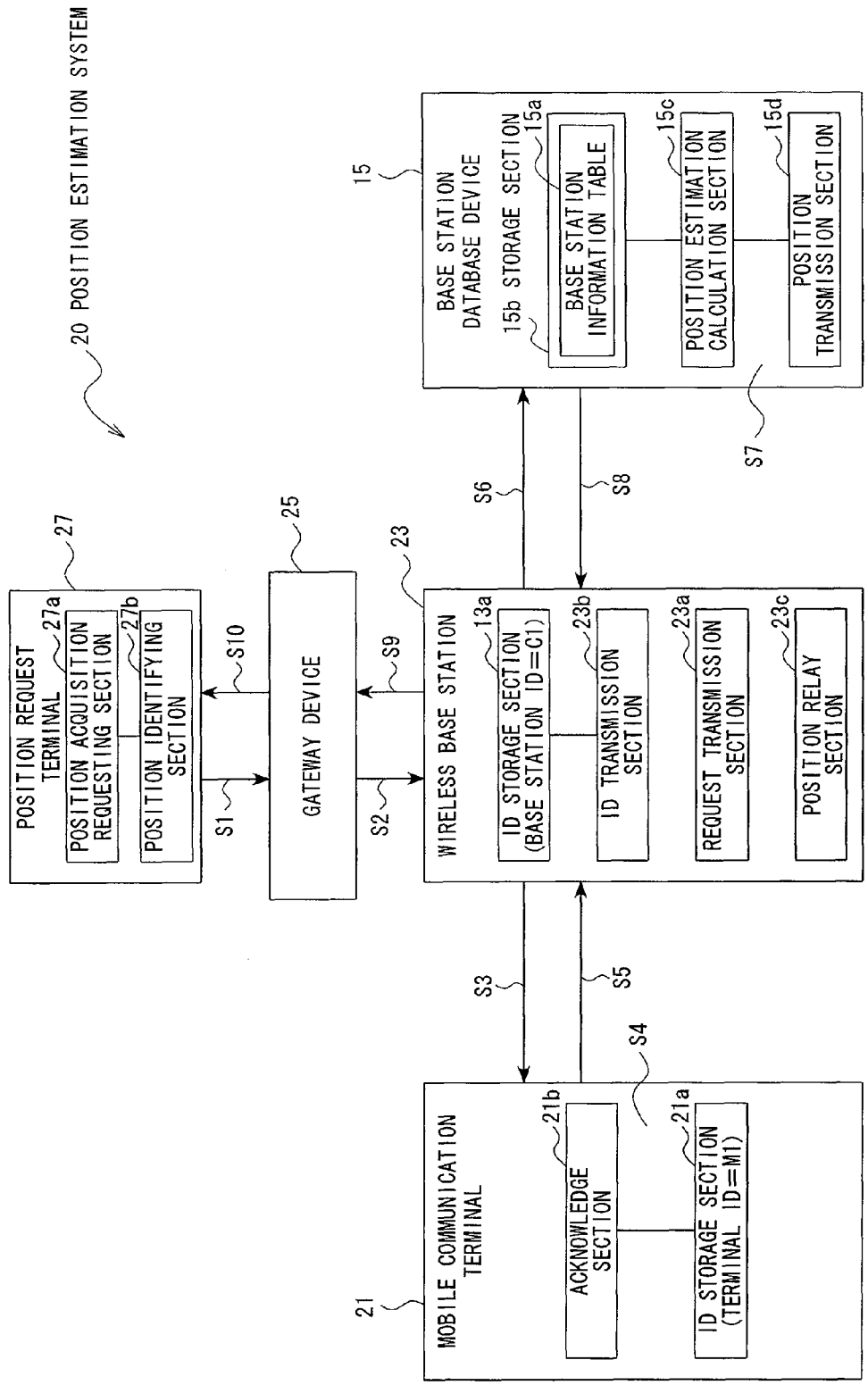
FIG. 5 is a block diagram which shows a configuration of a position estimation system according to a second embodiment of the present invention.

FIG. 5 is a block diagram which shows a configuration of a position estimation system according to a second embodiment of the present invention.

A position estimation system 20 of the second embodiment shown in FIG. 5 is a system based on a W-CDMA mobile communication system, and comprises a mobile communication terminal 21 such as a cellular phone, a wireless base station 23 connected to the mobile communication terminal 21 through wireless communication, and the above described base station database device 15 connected in communication to the wireless base station 23, and further comprises a position request terminal 27 connected in communication with the wireless base station 23 through a gateway device 25.

This position estimation system 20 has a configuration for obtaining a terminal ID such as a telephone number and acquiring a position of the relevant mobile communication terminal 21 by the position request terminal 27 such as a personal computer, and is characterized in that, even if the mobile communication terminal 21 whose position is to be detected is in an environment where the terminal cannot communicate with a GPS, the position of the terminal 21 can be estimated and acquired such that the position is defined more narrowly than a sector area of the wireless base station 13 in which the terminal 21 is located.

The position request terminal 27 comprises a position acquisition requesting section 27a which specifies a terminal ID of the mobile communication terminal 21 whose position is to be acquired and makes a position acquisition request to the wireless base station 23 via the gateway device 25, and a position identifying section 27b which identifies information of an estimated latitude and longitude, which is sent back via the gateway device 25 from the wireless base station 23 in response to the position acquisition request, as the position of the mobile communication terminal 21 whose position is to be acquired.

The gateway device 25 is a server such as an HTTP (Hyper Text Transfer Protocol) server, and relays data communication between the position request terminal 27 and the wireless base station 23 using a protocol such as an HTTP protocol.

The wireless base station 23 comprises a request transmission section 23a which wirelessly transmits position acquisition request information including the terminal ID received from the position request terminal 27 via the gateway device 25, to the mobile communication terminal, an ID storage section 13a which stores its own base station ID (for example, C1), an ID transmission section 23b which sends the base station ID to the above described base station database device 15 when a response signal in response to the position acquisition request from the mobile communication terminal 21 is received, and a position relay section 23c which relays information of the estimated latitude and longitude sent back from the base station database device 15, through the gateway device 25 to the position request terminal 27. It is noted that when the wireless base station 23 wirelessly transmits position acquisition request information by the request transmission section 23a, this information will be sent to all the mobile communication terminals located in the radio area of the wireless base station 23.

The mobile communication terminal 21 comprises an ID storage section 21a which stores its own terminal ID (for example, M1), and an acknowledgement section 21b which checks whether or not a terminal ID included in the position acquisition request information received from the wireless base station 23 is identical to its own terminal ID stored in the ID storage section 21a, and if it is identical to its own terminal ID, sends back a response signal to the wireless base station 23 which has sent the position acquisition request.

There will be described the processing operation by the position estimation system 20 in the above described configuration, in which even if the terminal 21 whose position is to be detected is in an environment where the terminal 21 cannot communicate with the GPS when a terminal ID is specified and a position of the relevant mobile communication terminal 21 is acquired by the position request terminal 27, the position of the terminal 21 is estimated and acquired.

First, in step S1, the position request terminal 27 specifies the terminal ID=M1 of the mobile communication terminal 21 whose position is to be detected and makes a position acquisition request by the position acquisition requesting section 27a. In step S2, information of the position acquisition request is sent to the wireless base station 23 via the gateway device 25. Upon receiving the information, the wireless base station 23 wirelessly transmits the information of the position acquisition request throughout the radio area by the request transmission section 23a in step S3.

When the position acquisition request information is received by the mobile communication terminal 21, the mobile communication terminal 21 checks by the acknowledgement section 21b whether or not a terminal ID included in the received position acquisition request information is identical to its own terminal ID stored in the ID storage section 21a in step S4. If they are different as a result, no processing is performed. If they are identical, in step 5, a response signal is sent back to the wireless base station 23 which has sent the position acquisition request.

Upon receiving this response signal, the wireless base station 23 reads out its own base station ID=C1 stored in the ID storage section 13a and sends the ID to the base station database device 15 by the ID transmission section 23b in step S6.

Upon receiving the base station ID=C1, the base station database device 15 reads in information associated with the received base station ID=C1 which is required for latitude and longitude estimation calculation from the base station information table 15a and performs the latitude and longitude estimation calculation processing by the position estimation calculation section 15c in step S7. A result of this is assumed here to be the same as previously described. That is, the estimated latitude and longitude (LaM, LoM) of the mobile communication terminal 21 is (20°00'03", 120°00'00").

Then, in step S8, the base station database device 15 sends back information of the estimated latitude and longitude (LaM, LoM)=(20°00'03", 120°00'00") to the wireless base station 23 having the base station ID corresponding to the information by the position transmission section 15d. Upon receiving the information of the estimated latitude and longitude (LaM, LoM)=(20°00′03″, 120°00′00″), the wireless base station 23 sends back this information by the position relay section 23c via the gateway device 25 to the position request terminal 27 requesting the acquisition of the position in step S9.

When the position request terminal 27 receives the information of the estimated latitude and longitude (LaM, LoM)= (20°00′03″, 120°00′00″), it identifies the received information, that is, the estimated latitude and longitude (LaM, LoM)=(20°00′03″, 120°00′00″) as the position of the target mobile communication terminal 21 by the position identifying section 27b. The identified latitude and longitude is outputted, for example, by a display (not shown) or as sound so that a user of the position request terminal 27 can recognize the latitude and longitude.

As described above, according to the position estimation system 20 of the second embodiment, even if the mobile communication terminal 21 whose position is to be detected is in an environment where the terminal 21 cannot communicate with a GPS when a terminal ID such a telephone number is specified and a position of the relevant mobile communication terminal 21 is acquired by the position request terminal 27, a latitude and longitude of the center of a sector of the wireless base station 23 in which the mobile communication terminal 21 is located is obtained, and is estimated as the latitude and longitude of the mobile communication terminal 21, and this estimated latitude and longitude is sent back to the position request terminal 27. Thereby, the position is defined more narrowly than a sector area that is a unit of estimation allowed by conventional position estimation, so that the position estimation of the mobile communication terminal 21 can be more accurately performed to be notified to the position request terminal 27.

Third Embodiment

Figure 6:
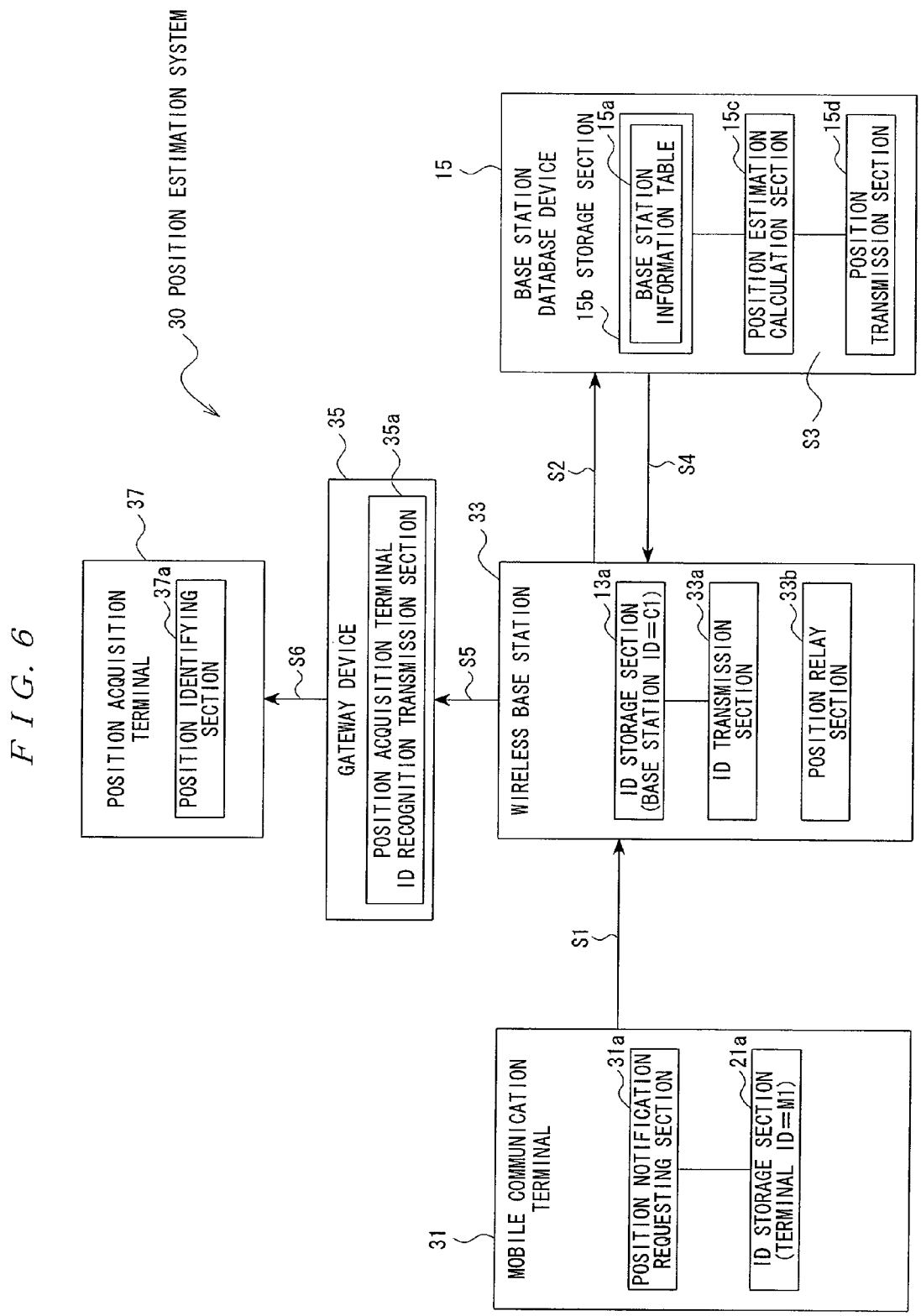
FIG. 6 is a block diagram which shows a configuration of a position estimation system according to a third embodiment of the present invention.

FIG. 6 is a block diagram which shows a configuration of a position estimation system according to a third embodiment of the present invention.

A position estimation system 30 of the third embodiment shown in FIG. 6 is a system based on a W-CDMA mobile communication system, and comprises a mobile communication terminal 31 such as a cellular phone, a wireless base station 33 connected to the mobile communication terminal 31 through wireless communication, and the above described base station database device 15 connected in communication to the wireless base station 33, and further comprises a position acquisition terminal 37 connected in communication with the wireless base station 33 through a gateway device 35.

This position estimation system 30 has a configuration for the mobile communication terminal 31 to notify the predetermined position acquisition terminal 37 of a position of the mobile communication terminal 31 itself, and is characterized in that even if the mobile communication terminal 31 whose position is to be detected is in an environment where the terminal cannot communicate with a GPS, the position of the terminal 31 can be estimated such that the position is defined more narrowly than a sector area of the wireless base station 13 in which the terminal 31 is located, and the estimated position can be notified to the position acquisition terminal 37.

The mobile communication terminal 31 comprises: the ID storage section 21a which stores its own terminal ID (for example, M1); and a position notification requesting section 31a which specifies a position acquisition terminal ID that is unique information to the terminal 37 in the predetermined position acquisition terminal 37, and which makes a request for notification of the position of the terminal 31 using position notification request information including the position acquisition terminal ID and the terminal ID of the terminal 31.

The wireless base station 33 comprises: the ID storage section 13a which stores its own base station ID (for example, C1); an ID transmission section 33a which sends the base station ID to the base station database device 15 when the position notification request information sent from the mobile communication terminal 31 is received; and a position relay section 33b which adds the relevant position acquisition terminal ID and the terminal ID of the terminal requesting the position notification request to estimated latitude and longitude information sent back from the base station database device 15, and then relays this information to the gateway device 35.

The gateway device 35 is a server such as an HTTP server, and comprises a position acquisition terminal ID recognition transmission section 35a which recognizes the position acquisition terminal ID included in the estimated latitude and longitude information received from the wireless base station 33, and sends the estimated latitude and longitude information to the position acquisition terminal 37 having the recognized terminal ID.

The position acquisition terminal 37 comprises a position identifying section 37a which identifies the estimated latitude and longitude information from the gateway device 35 as the position of the mobile communication terminal 31 having the terminal ID of the terminal requesting the position notification request included in this information.

There will be described the processing operation by the position estimation system 30 in the above described configuration, in which even if the mobile communication terminal 31 whose position is to be notified is in an environment where the terminal 31 cannot communicate with a GPS when the mobile communication terminal 31 notifies the predetermined position acquisition terminal 37 of a position of the terminal 31 itself, the position of the terminal 31 is estimated and notified.

First, in step S1, the mobile communication terminal 31 specifies a position acquisition terminal ID of the terminal 37 in the predetermined position acquisition terminal 37 and makes a request for notification of the position of the terminal 31 itself using position notification request information including the position acquisition terminal ID and the terminal ID of the terminal 31 itself by the position notification requesting section 31a.

When the wireless base station 33 receives this position notification request information, the wireless base station 33 reads out the own base station ID=C1 stored in the ID storage section 13a and sends the ID to the base station database device 15 by the ID transmission section 33a in step S2.

Upon receiving the base station ID=C1, the base station database device 15 reads in information associated with the received base station ID=C1 which is required for latitude and longitude estimation calculation from the base station information table 15a and performs the latitude and longitude estimation calculation processing by the position estimation calculation section 15c in step S3. A result of this is assumed here to be the same as previously described. That is, the estimated latitude and longitude (LaM, LoM) of the mobile communication terminal 31 is (20°00′03″, 120°00′00″).

Then, in step S4, the base station database device 15 sends back information of the estimated latitude and longitude (LaM, LoM)=(20°00′03″, 120°00′00″) to the wireless base station 33 having the base station ID corresponding to the information by the position transmission section 15d. Upon receiving the information of the estimated latitude and longitude (LaM, LoM)=(20°00'03", 120°00'00"), the wireless base station 33 adds the relevant position acquisition terminal ID and the terminal ID of the terminal requesting the position notification request to the information of the estimated latitude and longitude and sends this estimated latitude and longitude information to the gateway device 35 by the position relay section 33b in step S5.

Upon receiving this estimated latitude and longitude information, the gateway device 35 recognizes the position acquisition terminal ID included in the received estimated latitude and longitude information and sends the estimated latitude and longitude information to the position acquisition terminal 37 having the recognized ID by the position acquisition terminal ID recognition transmission section 35a in step S6.

Upon receiving this estimated latitude and longitude information, the position acquisition terminal 37 identifies the received estimated latitude and longitude (LaM, LoM)= (20°00'03", 120°00'00") as the position of the mobile communication terminal 31 having the terminal ID of the terminal requesting the position notification request included in the information. The identified latitude and longitude is outputted, for example, by display (not shown) or as sound so that a user of the position acquisition terminal 37 can recognize the latitude and longitude.

As described above, according to the position estimation system 30 of the third embodiment, when the mobile communication terminal 31 notifies the predetermined position acquisition terminal 37 of a position of the terminal 31 itself, even if the mobile communication terminal 31 which is the source of the position notification is in an environment where the terminal 31 cannot communicate with a GPS, a latitude and longitude of the center of a sector of the wireless base station 33 in which the mobile communication terminal 31 is located is obtained, and is estimated as the latitude and longitude of the mobile communication terminal 31, and this latitude and longitude is notified to the position acquisition terminal 37 via the gateway device 35. Thereby, the position is defined more narrowly than a sector area that is a unit of estimation allowed by conventional position estimation and therefore the position of the mobile communication terminal 31 can be estimated more accurately and notified to the position acquisition terminal 37.

Fourth Embodiment

Figure 7:
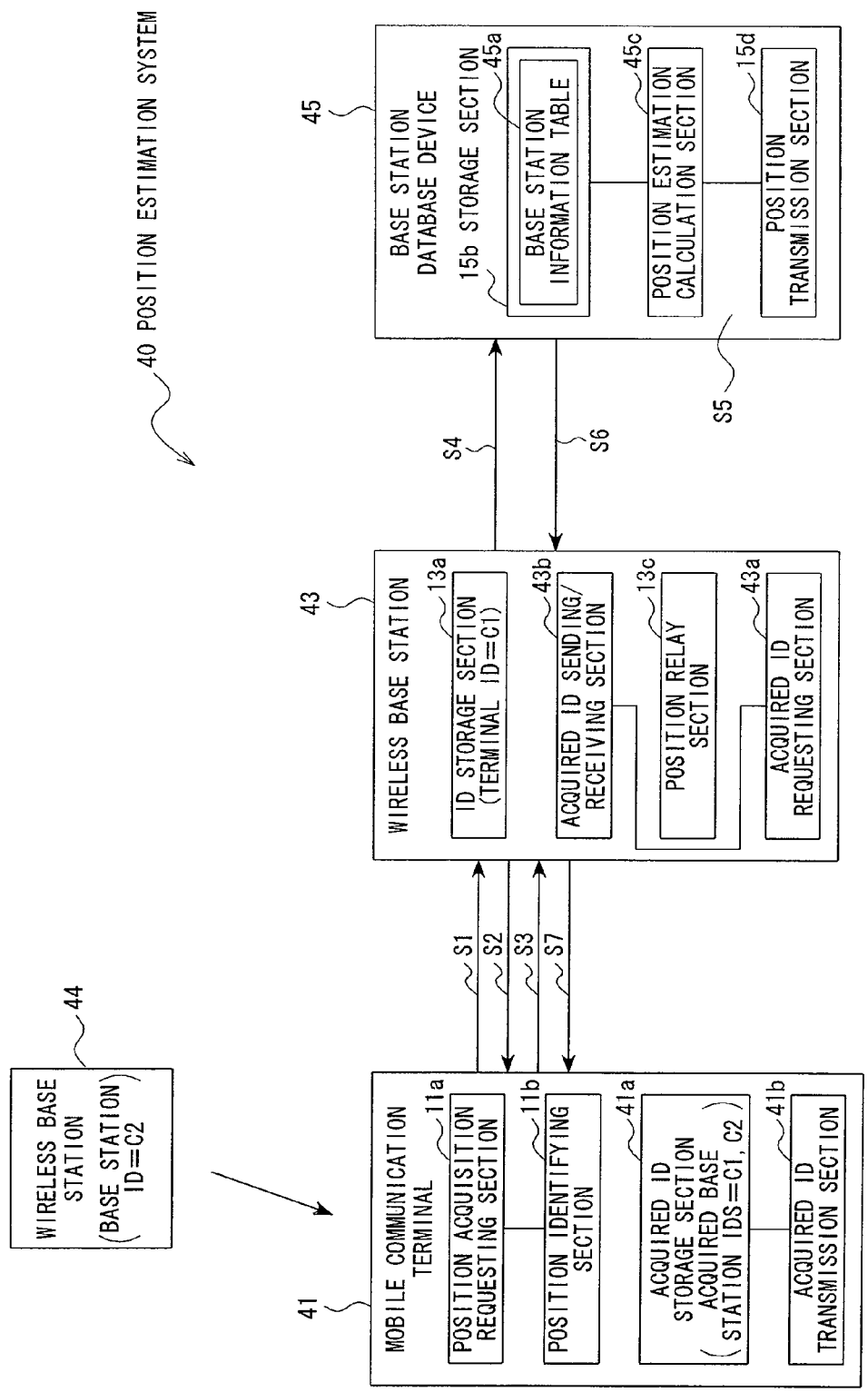
FIG. 7 is a block diagram which shows a configuration of a position estimation system according to a fourth embodiment of the present invention.

FIG. 7 is a block diagram which shows a configuration of a position estimation system according to a fourth embodiment of the present invention.

A position estimation system 40 of the fourth embodiment shown in FIG. 7 is a system based on a W-CDMA mobile communication system, and comprises a mobile communication terminal 41 such as a cellular phone, a plurality of wireless base stations 43, 44 connected to the mobile communication terminal 41 through wireless communication, and a base station database device 45 having a server function which is connected to the wireless base stations 43, 44 through wireless or wire communication.

This position estimation system 40 is characterized in that, even if the mobile communication terminal 41 whose position is to be detected is in an environment where the terminal 41 cannot communicate with a GPS, a position of the mobile communication terminal 41 is estimated from information of a plurality of wireless base stations 43, 44 having areas in which the terminal 41 is located, so that the position of the terminal can be further accurately estimated compared to estimation from just one wireless base station 43.

The mobile communication terminal 41 comprises a position acquisition requesting section 11a, a position identifying section 11b, an acquired ID storage section 41a which stores IDs {acquired base station IDs (=C1, C2)} of the wireless base stations 43, 44 which have areas in which the terminal 41 is located where the terminal 41 can communicate with (can acquire) the wireless base stations 43, 44 respectively, and an acquired ID transmission section 41b which, in response to a request for acquisition of the acquired base station IDs sent from the wireless base station 43 in communication with the terminal 41, sends the acquired base station IDs stored in the acquired ID storage section 41a to the requesting base station 43.

The wireless base station 43 comprises an ID storage section 13a, a position relay section 13c, an acquired ID requesting section 43a which makes a request for acquisition of the acquired base station IDs to the mobile communication terminal 41 requesting the acquisition of the position when the position acquisition request is received from the mobile communication terminal 41, and an acquired ID sending/receiving section 43b which receives the acquired base station IDs sent in response to the request for the acquisition of the acquired base station IDs and sends the acquired base station IDs to the base station database device 45. The wireless base station 44 has the same configuration.

The base station database device 45 comprises the storage section 15b which stores a base station information table 45a in which information of the plurality of wireless base stations is associated with the respective base station ID, a position estimation calculation section 45c, and the position transmission section 15d.

As shown in FIG. 8A, the base station information table 45a is configured such that each of the base station IDs=C1, C2 is associated with base station latitude La1, base station longitude Lo1, tilt angle θ, antenna aperture angle 2θ, antenna directivity, and antenna height h. In this example, one base station ID=C1 is associated with base station latitude La1=20.000, base station longitude Lo1=120.000, tilt angle θ=30°, antenna aperture angle 2θ=60°, antenna directivity=0°, and antenna height h=100 m, and the other base station ID=C2 is associated with base station latitude La1=25.000, base station longitude Lo1=150.000, tilt angle θ=30°, antenna aperture angle 2θ=60°, antenna directivity=180°, and antenna height h=100 m.

The position estimation calculation section 45c obtains an estimated latitude and longitude by the above described latitude and longitude estimation calculation for each of the wireless base stations 43, 44 using each base station information respectively associated with the acquired base station IDs=C1, C2 sent from the wireless base station 43, and further obtains an average of these estimated latitudes and longitudes, and determines this average as the estimated position (estimated latitude and longitude) of the mobile communication terminal 41. The whole of the above described calculation processing is referred to as latitude and longitude estimation average calculation processing.

The position transmission section 15d sends position information of the estimated latitude and longitude of the mobile communication terminal 41 obtained by the latitude and longitude estimation average calculation processing of the position estimation calculation section 45c to the wireless base station 43 which has sent the base station IDs.

Now, details of processing will be described in which the average calculation processing is performed after the latitude and longitude estimation calculation processing is preformed with respect to the wireless base stations 43, 44 by the position estimation calculation section 45c.

The estimated latitude and longitude (LaM, LoM) obtained by the latitude and longitude estimation calculation processing with respect to the base station ID=C1 is (20°00'03", 120°00'00") as described above and as shown in FIG. 8B. On the other hand, the estimated latitude and longitude (LaM, LoM) obtained by the latitude and longitude estimation calculation processing with respect to the base station ID=C2 is (24°59'57", 150°00'00") as described above and as shown in FIG. 8B.

The average of these estimated latitudes and longitudes is (22°50'00", 135°00'00"), which becomes the estimated latitude and longitude of the mobile communication terminal 41.

There will be described with reference to FIG. 7 the processing operation by the position estimation system 40 in the above described configuration, in which a latitude and longitude of the mobile communication terminal 41 in an environment where the terminal 41 cannot communicate with a GPS is estimated.

It is assumed here that the mobile communication terminal 41 is currently located in radio areas of two wireless base stations 43, 44 between which the terminal 41 can be handed over, and thereby the acquired base station IDs=C1, C2 are stored in the acquired ID storage section 41a, and the mobile communication terminal 41 is in communication with one wireless base station 43.

First, in step S1, the mobile communication terminal 41 makes a position acquisition request to the wireless base station 43 communicating therewith by the position acquisition requesting section 11a. Upon receiving the position acquisition request, the wireless base station 43 makes an acquired base station ID acquisition request by the acquired ID requesting section 43a to the mobile communication terminal 41 requesting the acquisition of the position in step S2.

Upon receiving this acquisition request, the mobile communication terminal 41 sends the acquired base station IDs=C1, C2 stored in the acquired ID storage section 41a to the requesting base station 43 in response to the acquisition request in step S3.

The wireless base station 43 receives the acquired base station IDs=C1, C2 and sends the IDs=C1, C2 to the base station database device 45 by the acquired ID sending/receiving section 43b in step S4.

Upon receiving the acquired base station IDs=C1, C2, the base station database device 45 reads in information associated with the received acquired base station IDs=C1, C2 which is required for the latitude and longitude estimation average calculation from the base station information table 45a and performs the latitude and longitude estimation average calculation processing by the position estimation calculation section 45c in step S5.

Specifically, base station information respectively associated with the base station IDs=C1, C2 is read in, the latitude and longitude estimation calculation is performed with respect to each base station information, the average of the calculated values of these estimated latitudes and longitudes is obtained, and this obtained average is determined as the estimated latitude and longitude of the mobile communication terminal 41.

Then, the base station database device 45 sends back information of the estimated latitude and longitude to the wireless base station 43 which has sent the acquired base station IDs corresponding to the information by the position transmission section 15d in step S6. Upon receiving the information of the estimated latitude and longitude, the wireless base station 43 sends back the estimated latitude and longitude information by the position relay section 13c to the mobile communication terminal 41 requesting the acquisition of the position in step S7.

Upon receiving the estimated latitude and longitude information, the mobile communication terminal 41 identifies the estimated latitude and longitude as the position of the terminal 41 itself by the position identifying section 11b. The identified latitude and longitude is outputted, for example, by display (not shown) or as sound so that a user of the mobile communication terminal 41 can recognize the latitude and longitude.

As described above, according to the position estimation system 40 of the fourth embodiment, even if the mobile communication terminal 41 is in an environment where the terminal 41 cannot communicate with a GPS, a latitude and longitude of a center of a sector for each of a plurality of wireless base stations 43, 44 in which the mobile communication terminal 41 is located is obtained, and an average of these latitudes and longitudes is estimated as a latitude and longitude of the mobile communication terminal 41, so that the position of the mobile communication terminal 41 can be further accurately estimated compared to estimation from just one wireless base station 43.

Fifth Embodiment

Figure 9:
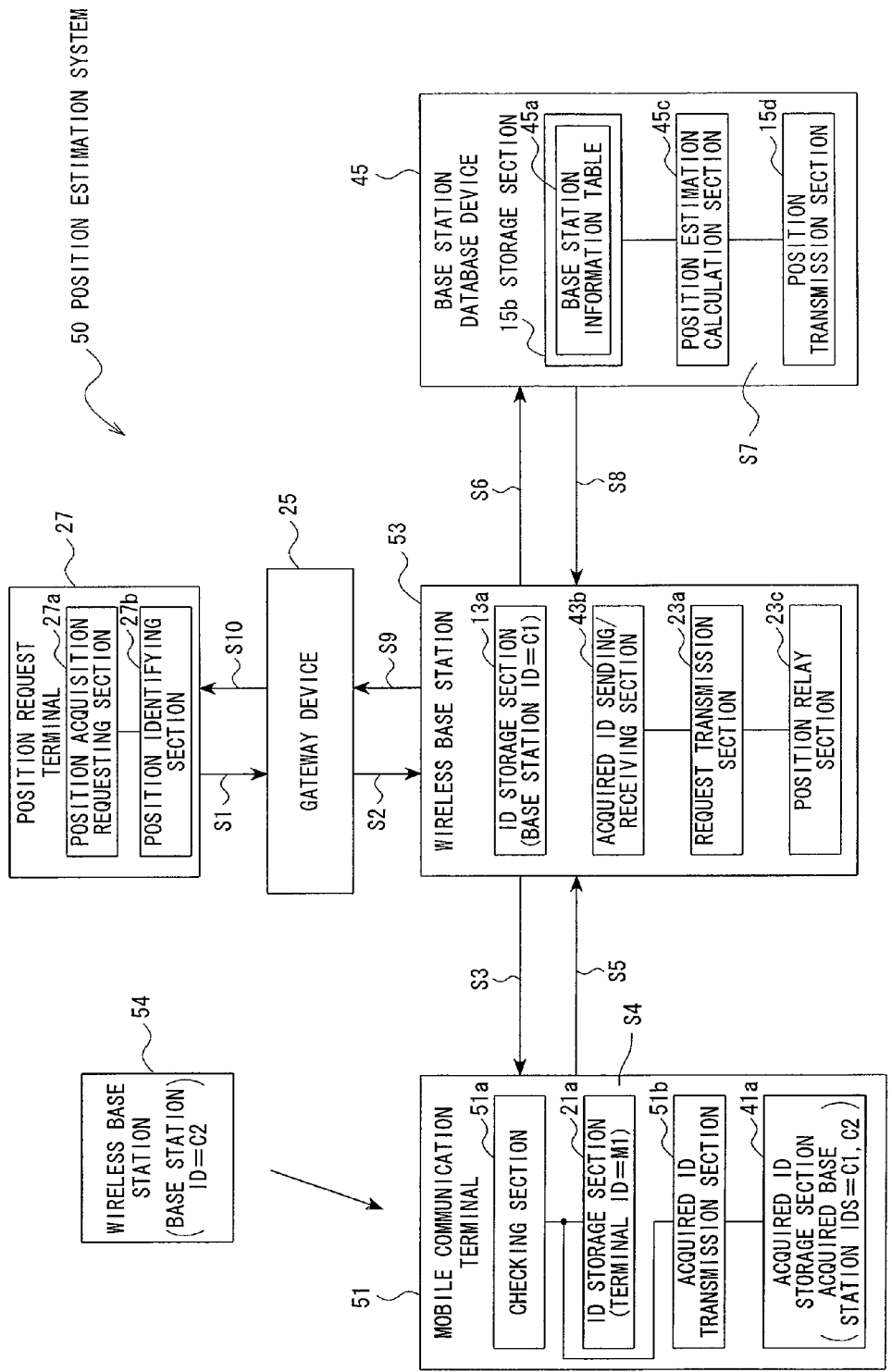
FIG. 9 is a block diagram which shows a configuration of a position estimation system according to a fifth embodiment of the present invention.

FIG. 9 is a block diagram which shows a configuration of a position estimation system according to a fifth embodiment of the present invention.

A position estimation system 50 of the fifth embodiment shown in FIG. 9 is a system based on a W-CDMA mobile communication system, and comprises a mobile communication terminal 51 such as a cellular phone, a wireless base station 53 connected to the mobile communication terminal 51 through wireless communication, and the above described base station database device 45 connected in communication to the wireless base station 53, and further comprises the position request terminal 27 connected in communication with the wireless base station 53 through the gateway device 25.

This position estimation system 50 has a configuration for specifying a terminal ID such as a telephone number and acquiring a position of the relevant mobile communication terminal 51 by the position request terminal 27 such as a personal computer, and is characterized in that, even if the mobile communication terminal 51 whose position is to be detected is in an environment where the terminal 51 cannot communicate with a GPS, a position of the mobile communication terminal 51 is estimated from information of a plurality of wireless base stations 53, 54 having areas in which the terminal 51 is located, so that the position of the terminal can be further accurately estimated and acquired compared to estimation from just one wireless base station 53.

The position request terminal 27 comprises the position acquisition requesting section 27a which specifies a terminal ID of the mobile communication terminal 51 whose position is desired to be acquired and makes a position acquisition request to the wireless base station 53 via the gateway device 25, and the position identifying section 27b which identifies information of an estimated latitude and longitude, which is sent back via the gateway device 25 from the wireless base station 53 in response to the position acquisition request, as the position of the mobile communication terminal 51 whose position is to be acquired.

The gateway device 25 is a server such as an HTTP server, and relays data communication between the position request terminal 27 and the wireless base station 53 via a protocol such as an HTTP protocol.

The wireless base station 53 comprises an ID storage section 13a, a request transmission section 23a which wirelessly transmits position acquisition request information including the terminal ID received from the position request terminal 27 via the gateway device 25, to the mobile communication terminal, an acquired ID sending/receiving section 43b which receives an acquired base station IDs sent in response to the position acquisition request information and sends the acquired base station IDs to the base station database device 45, and the position relay section 23c. It is noted that when the wireless base station 53 wirelessly transmits position acquisition request information by the request transmission section 23a, this information will be sent to all the mobile communication terminals located in the radio area of the wireless base station 53. The wireless base station 54 has the same configuration.

The mobile communication terminal 51 comprises the ID storage section 21a which stores its own terminal ID (for example, M1), the acquired ID storage section 41a which stores IDs {acquired base station IDs (=C1, C2)} of the wireless base stations 53, 54 which have areas in which the terminal 51 is located where the terminal 51 can communicate with (can acquire) the wireless base stations 53, 54 respectively, a checking section 51a which checks whether or not the terminal ID included in the position acquisition request information received from the wireless base station 53 is identical to the terminal ID of the mobile communication terminal 51 itself stored in the ID storage section 21a, an acquired ID transmission section 51b which, if the IDs are determined to be identical by the checking section 51a, sends the acquired base station IDs stored in the acquired ID storage section 41a to the requesting base station 53. A check/transmission section is composed of: the checking section 51a; and the acquired ID transmission section 51b.

There will be described the processing operation by the position estimation system 50 in the above described configuration, in which even if the terminal 51 whose position is to be detected is in an environment where the terminal 51 cannot communicate with the GPS when a terminal ID is specified and a position of the relevant mobile communication terminal 51 is acquired by the position request terminal 27, the position of the terminal 51 is estimated and acquired.

First, in step S1, the position request terminal 27 specifies the terminal ID=M1 of the mobile communication terminal 51 whose position is to be detected and makes a position acquisition request by the position acquisition requesting section 27a. In step S2, information of the position acquisition request is sent to the wireless base station 53 via the gateway device 25. Upon receiving the information, the wireless base station 53 wirelessly transmits the information of the position acquisition request throughout the radio area by the request transmission section 23a in step S3.

When the position acquisition request information is received by the mobile communication terminal 51, the mobile communication terminal S1 checks by the checking section 51a whether or not a terminal ID included in the received position acquisition request information is identical to its own terminal ID stored in the ID storage section 21a in step S4. If they are different as a result, no processing is performed. If they are identical, the acquired ID transmission section 51b sends the acquired base station IDs=C1, C2 stored in the acquired ID storage section 41a to the requesting base station 53 in step S5.

The wireless base station 53 receives the acquired base station IDs=C1, C2 and sends the IDs=C1, C2 to the base station database device 45 by the acquired ID sending/receiving section 43b in step S6.

Upon receiving the acquired base station IDs=C1, C2, the base station database device 45 reads in information associated with the received acquired base station IDs=C1, C2 which is required for the latitude and longitude estimation average calculation from the base station information table 45a and performs the latitude and longitude estimation average calculation processing by the position estimation calculation section 45c in step S7.

Specifically, base station information respectively associated with the base station IDs=C1, C2 is read in, the latitude and longitude estimation calculation is performed with respect to each base station information, the average of the calculated values of these estimated latitudes and longitudes is obtained, and this obtained average is determined as the estimated latitude and longitude of the mobile communication terminal 51.

Then, the base station database device 45 sends back information of the estimated latitude and longitude to the wireless base station 53 which has sent the acquired base station IDs corresponding to the information by the position transmission section 15d in step S8. Upon receiving the information of the estimated latitude and longitude, the wireless base station 53 sends back the information by the position relay section 23c to the position request terminal 27 requesting the acquisition of the position via the gateway device 25 in steps S9, S10.

When the position request terminal 27 receives the estimated latitude and longitude information, it identifies the received information, that is, the estimated latitude and longitude as the position of the target mobile communication terminal 51 by the position identifying section 27b. The identified latitude and longitude is outputted, for example, by display (not shown) or as sound so that a user of the position request terminal 27 can recognize the latitude and longitude.

As described above, according to the position estimation system 50 of the fifth embodiment, even if the mobile communication terminal 51 is in an environment where the terminal 51 cannot communicate with a GPS when a terminal ID such as a telephone number is specified and a position of the relevant mobile communication terminal 51 is acquired by the position request terminal 27, a latitude and longitude of a center of a sector for each of a plurality of wireless base stations 53, 54 in which the mobile communication terminal 51 is located is obtained, and an average of these latitudes and longitudes is estimated as a latitude and longitude of the mobile communication terminal 51, and this estimated latitude and longitude is sent back to the position request terminal 27. Thereby, the position of the terminal can be further accurately estimated compared to estimation from just one wireless base station 53 and can be notified to the position request terminal 27.

Sixth Embodiment

FIG. 10 is a block diagram which shows a configuration of a position estimation system according to a sixth embodiment of the present invention.

A position estimation system 60 of the sixth embodiment shown in FIG. 10 is a system based on a W-CDMA mobile communication system, and comprises a mobile communication terminal 61 such as a cellular phone, a wireless base station 63 connected to the mobile communication terminal 61 through wireless communication, and the above described base station database device 45 connected in communication to the wireless base station 63, and further comprises the position acquisition terminal 37 connected in communication with the wireless base station 63 through the gateway device 35.

This position estimation system 60 has a configuration for the mobile communication terminal 61 to notify the predetermined position acquisition terminal 37 of a position of the mobile communication terminal 61 itself, and is characterized in that even if the mobile communication terminal 61 whose position is to be detected is in an environment where the terminal cannot communicate with a GPS, a position of the mobile communication terminal 61 is estimated from information of a plurality of wireless base stations 63, 64 having areas in which the terminal 61 is located, so that the position of the terminal can be further accurately estimated compared to estimation from just one wireless base station 63 and the estimated position can be notified.

The mobile communication terminal 61 comprises the ID storage section 21a which stores its own terminal ID (for example, M1), the acquired ID storage section 41a which stores IDs {acquired base station IDs (=C1, C2)} of the wireless base stations 63, 64 which have areas in which the terminal 61 is located where the terminal 61 can communicate with (can acquire) the wireless base stations 63, 64 respectively, and a position notification requesting section 61a which specifies a position acquisition terminal ID (that is unique information to the terminal 37) in the predetermined position acquisition terminal 37, and makes a request for notification of the position of the terminal 61 itself using position notification request information including the position acquisition terminal ID, the terminal ID of the terminal 61 itself stored in the storage section 21a, and the acquired base station IDs stored in the storage section 41a.

The wireless base station 63 comprises the ID storage section 13a, a request receiving section 63a which receives the position notification request information sent from the mobile communication terminal 61 and outputs the acquired base station IDs in the information to the acquired ID transmission section 63b as well as outputs the position acquisition terminal ID and the terminal ID to the position relay section 33b, the acquired ID sending/receiving section 43b which sends the acquired base station IDs from the request receiving section 63a to the base station database device 45, and a position relay section 63c which adds the position acquisition terminal ID and terminal ID from the request receiving section 63a to estimated latitude and longitude information sent back from the base station database device 45, and relays this information to the gateway device 35.

The gateway device 35 is a server such as an HTTP server, and comprises the position acquisition terminal ID recognition transmission section 35a which recognizes the position acquisition terminal ID included in the estimated latitude and longitude information received from the wireless base station 63, and sends the estimated latitude and longitude information to the position acquisition terminal 37 having the recognized terminal ID.

The position acquisition terminal 37 comprises the position identifying section 37a which identifies the estimated latitude and longitude information from the gateway device 35 as the position of the mobile communication terminal 61 having the terminal ID of the terminal requesting the position notification request included in this information.

There will be described the processing operation by the position estimation system 60 in the above described configuration, in which even if the mobile communication terminal 61 whose position is to be notified is in an environment where the terminal 61 cannot communicate with a GPS when the mobile communication terminal 61 notifies the predetermined position acquisition terminal 37 of a position of the terminal 61 itself, the position of the terminal 61 is estimated and notified.

First, in step S1, the mobile communication terminal 61 specifies a position acquisition terminal ID of the terminal 37 in the predetermined position acquisition terminal 37 and makes a request for notification of the position of the terminal 61 itself using position notification request information including the position acquisition terminal ID and the terminal ID of the terminal 61 itself by the position notification requesting section 61a.

When the wireless base station 63 receives the position notification request information by the request receiving section 63a, it outputs the acquired base station IDs in the received information to the acquired ID transmission section 63b and outputs the position acquisition terminal ID and the terminal ID to the position relay section 63c, and the acquired ID transmission section 63b sends the acquired base station IDs to the base station database device 45 in step S2.

Upon receiving the acquired base station IDs=C1, C2, the base station database device 45 reads in information associated with the received acquired base station IDs=C1, C2 which is required for the latitude and longitude estimation average calculation from the base station information table 45a and performs the latitude and longitude estimation average calculation processing by the position estimation calculation section 45c in step S3.

Specifically, base station information respectively associated with the base station IDs=C1, C2 is read in, the latitude and longitude estimation calculation is performed with respect to each base station information, the average of the calculated values of these estimated latitudes and longitudes is obtained, and this obtained average is determined as the estimated latitude and longitude of the mobile communication terminal 51.

Then, the base station database device 45 sends back information of the estimated latitude and longitude to the wireless base station 43 which has sent the acquired base station IDs corresponding to the information by the position transmission section 15d in step S4.

Upon receiving the information of the estimated latitude and longitude, the wireless base station 43 adds the relevant position acquisition terminal ID and the terminal ID of the terminal requesting the position notification request to the information of the estimated latitude and longitude and sends this estimated latitude and longitude information to the gateway device 35 by the position relay section 63c in step S5.

Upon receiving this estimated latitude and longitude information, the gateway device 35 recognizes the position acquisition terminal ID included in the received estimated latitude and longitude information and sends the estimated latitude and longitude information to the position acquisition terminal 37 having the recognized ID by the position acquisition terminal ID recognition transmission section 35a in step S6.

Upon receiving this estimated latitude and longitude information, the position acquisition terminal 37 identifies the received estimated latitude and longitude information as the position of the mobile communication terminal 61 having the terminal ID of the terminal requesting the position notification request included in the information. The identified latitude and longitude is outputted, for example, by display (not shown) or as sound so that a user of the position acquisition terminal 37 can recognize the latitude and longitude.

As described above, according to the position estimation system 60 of the sixth embodiment, even if the mobile communication terminal 61 which is the source of the position notification is in an environment where the terminal 61 cannot communicate with a GPS when the mobile communication terminal 61 notifies the predetermined position acquisition terminal 37 of a position of the terminal 61 itself, a latitude and longitude of a center of a sector for each of a plurality of wireless base stations 63, 64 in which the mobile communication terminal 61 is located is obtained, and an average of these latitudes and longitudes is estimated as a latitude and longitude of the mobile communication terminal 61, and this estimated latitude and longitude is notified to the position acquisition terminal 37. Thereby, the position of the terminal can be further accurately estimated compared to estimation from just one wireless base station 63 and can be notified to the position acquisition terminal 37.

Seventh Embodiment

FIG. 11 is a block diagram which shows a configuration of a position estimation system according to a seventh embodiment of the present invention.

A position estimation system 70 of the seventh embodiment shown in FIG. 11 is a system based on a W-CDMA mobile communication system, and comprises a mobile communication terminal 71 such as a cellular phone, a wireless base station 73 connected to the mobile communication terminal 71 through wireless communication, and the above described base station database device 45 connected in communication to the wireless base station 73, and further comprises the position request terminal 27 connected in communication with the wireless base station 73 through the gateway device 25.

This position estimation system 70 has a configuration for specifying a terminal ID and acquiring a position of the relevant mobile communication terminal 71 by the position request terminal 27, and is characterized in that, if the terminal ID is notified to the base station 73, and the mobile communication terminal 71 having the specified ID is located in a radio area of this base station 73, it is allowed that, even though the relevant base station 73 is in communication with another base station, a latitude and longitude position of the mobile communication terminal 71 is accurately estimated and sent back to the position request terminal 27.

The mobile communication terminal 71 comprises the ID storage section 21a which stores its own terminal ID (for example, M1), the acquired ID storage section 41a which stores IDs {acquired base station IDs (=C1, C2)} of the wireless base stations 73, 74 which have areas in which the terminal 51 is located where the terminal 51 can communicate with (can acquire) the wireless base stations 73, 74 respectively, and an acquired ID transmission section 71a which, when the terminal 71 is located in the radio area of the base station 73, sends its own terminal ID stored in the ID storage section 21a associated with the acquired base station IDs stored in the acquired ID storage section 41a to the wireless base station 73.

The wireless base station 73 comprises the ID storage section 13a, an acquired ID receiving section 73a which receives acquired base station IDs paired with the terminal ID from the mobile communication terminal 71, a terminal ID information storage section 73b which stores the received acquired base station IDs paired with the terminal ID, a location checking/ID transmission section 73c which, when position acquisition request information including the terminal ID received from the position request terminal 27 through the gateway device 25 is received, if the mobile communication terminal 71 having the relevant terminal ID is located in an area of the base station 73, sends the acquired base station IDs paired with the relevant terminal ID stored in the terminal ID information storage section 73b to the base station database device 45, and the position relay section 23c. The wireless base station 74 has the same configuration.

There will be described the processing operation by the position estimation system 70 in the above described configuration, in which a terminal ID is specified and a position of the relevant mobile communication terminal 71 is acquired by the position request terminal 27.

It is assumed here that the mobile communication terminal 71 is located in radio areas of both the wireless base stations 73, 74, its own terminal ID=M1 associated with the acquired base station IDs=C1, C2 has already been sent to the wireless base stations 73, 74 by the acquired ID transmission section 71a, and then the terminal 71 is in communication with the wireless base station 74.

First, in step S1, the position request terminal 27 specifies the terminal ID=M1 of the mobile communication terminal 71 whose position is to be detected and makes a position acquisition request by the position acquisition requesting section 27a. In step S2, information of the position acquisition request is sent to the wireless base station 73 via the gateway device 25.

The wireless base station 73 receives the position acquisition request information including the terminal ID from the position request terminal 27 and then checks whether or not the mobile communication terminal 71 having the relevant terminal ID is located in the area of the base station 73 by the location checking/ID transmission section 73c. Because the mobile communication terminal 71 is currently located in the radio area of this base station 73 although being also in communication with the other wireless base station 74, the location checking/ID transmission section 73c sends the acquired base station IDs=C1, C2 paired with the terminal ID=M1 stored in the terminal ID information storage section 73b to the base station database device 45 in step S3.

Upon receiving the acquired base station IDs=C1, C2, the base station database device 45 reads in information associated with the received acquired base station IDs=C1, C2 which is required for the latitude and longitude estimation average calculation from the base station information table 45a and performs the latitude and longitude estimation average calculation processing by the position estimation calculation section 45c in step S4.

Specifically, base station information respectively associated with the base station IDs=C1, C2 is read in, the latitude and longitude estimation calculation is performed with respect to each base station information, the average of the calculated values of these estimated latitudes and longitudes is obtained, and this obtained average is determined as the estimated latitude and longitude of the mobile communication terminal 71.

Then, the base station database device 45 sends back information of the estimated latitude and longitude to the wireless base station 43 which has sent the acquired base station IDs corresponding to the information by the position transmission section 15d in step S5. Upon receiving the information of the estimated latitude and longitude, the wireless base station 43 sends back the information by the position relay section 23c to the position request terminal 27 requesting the acquisition of the position via the gateway device 25 in steps 6, 7.

When the position request terminal 27 receives the estimated latitude and longitude information, it identifies the received information, that is, the estimated latitude and longitude as the position of the target mobile communication terminal 71 by the position identifying section 27b. The identified latitude and longitude is outputted, for example, by display (not shown) or as sound so that a user of the position request terminal 27 can recognize the latitude and longitude.

According to the position estimation system 70 of the seventh embodiment, if the specified terminal ID is notified to the wireless base station 73, and the mobile communication terminal 71 having the specified terminal ID is located in a radio area of this wireless base station 73, it is allowed that, even though the relevant wireless base station 73 is in communication with another wireless base station, a latitude and longitude of a center of a sector for each of a plurality of wireless base stations 73, 74 in which the mobile communication terminal 71 is located is obtained, an average of these latitudes and longitudes is estimated as a latitude and longitude of the mobile communication terminal 71, and this estimated latitude and longitude is sent back to the position request terminal 27. Thereby, the position of the terminal can be further accurately estimated compared to estimation from just one wireless base station 73 and can be notified to the position request terminal 27.

First Application of the Fourth to Seventh Embodiments

According to a first application of the fourth to seventh embodiments, as shown in FIG. 12, the base station IDs=C1, C2 of the base station information table 45*a* of the base station database device 45 are associated with priority levels 0, 1 (1 is high) respectively, and if the mobile communication terminal is located in radio areas of both of the wireless base stations having base station IDs=C1, C2, the position estimation calculation section 45*c* obtains an estimated latitude and longitude of a center of a sector for each of the wireless base stations as described above, and determines the estimated latitude and longitude corresponding to the ID having a higher priority level between them as the estimated latitude and longitude of the mobile communication terminal.

For example, when a wireless base station is placed in a large building, and a mobile communication terminal exists in the building, there is a case where the mobile communication terminal is located in radio areas of both the wireless base station in the building and an external wireless base station. In this case, since the mobile communication terminal is positioned in the building, if the latitude and longitude of the center of the sector of the wireless base station in the building, which is closer to the mobile communication terminal, is used, the position of the mobile communication terminal can be identified more accurately.

In this example, the priority level of the wireless base station in the building is set to higher than that of the external wireless base station, and if the mobile communication terminal is located in radio areas of both the wireless base stations, the latitude and longitude of the center of the sector of the wireless base station having a higher priority level is used.

Second Application of the Fourth to Seventh Embodiment

According to a second application of the fourth to seventh embodiment, as shown in FIG. 13, the base station IDs=C1, C2 of the base station information table 45*a* are associated with exception flags 0, 1 respectively. Flag 1 indicates that flag is on, which represents a wireless base station installed in a narrow area where a plurality of wireless base stations are installed. Then, when the position estimation calculation section 45*c* performs the latitude and longitude estimation calculation for the case where the mobile communication terminal is located in overlapping areas as described above, the latitude and longitude estimation calculation is not performed with respect to the wireless base station with the exception flag 1 on. Thus, the latitude and longitude calculation is performed only with respect to the wireless base station with the flag off.

The exception flag 1 is set on, for example, in the case where multiple wireless base station antennas are equipped in a narrow area such as inside a building. In this case, since multiple antennas are installed in the narrow area, a position cannot be calculated from radio waves from the antennas. Therefore, in the example of FIG. 13, while the latitude and longitude estimation calculation is not performed with respect to the base station ID=C2, a latitude and longitude of the center of the sector of the wireless base station having the base station ID=C1 is calculated and determined as the estimated latitude and longitude of the mobile communication terminal. Thereby, the estimated latitude and longitude position of the mobile communication terminal can be properly obtained.

Third Application of the Fourth to Seventh Embodiments

According to a third application of the fourth to seventh embodiments, as shown in FIG. 14, if the tilt angle θ of the base station ID=C2 of the base station information table 45*a* is zero degrees, a latitude and longitude of the center of a sector of this wireless base station cannot be calculated, and therefore, when the position estimation calculation section 45*c* performs the latitude and longitude estimation calculation for the case where the mobile communication terminal is located in overlapping areas as described above, the latitude and longitude estimation calculation is not performed with respect to the wireless base station whose tilt angle θ=0°. Thus, the latitude and longitude calculation is performed only with respect to the wireless base station whose tilt angle θ is not zero degrees. Thereby, the estimated latitude and longitude position of the mobile communication terminal can be properly obtained.

Additionally, in the second and third applications, when the position estimation calculation section 45*c* obtains the latitude and longitude of the center of the sector of the wireless base station having the base station ID that is not associated with the exception flag 1 or the tilt angle of zero degrees, and determines the obtained latitude and longitude as the estimated latitude and longitude of the mobile communication terminal, the position estimation calculation section 45*c* performs calculation processing for adding an error on a random basis to the estimated latitude and longitude.

Thereby, since an error is added to estimated latitude and longitude information to be wirelessly transmitted to the mobile communication terminal, the information can be prevented from being recognized by other terminals.

Forth Application of the Fourth to Seventh Embodiments

According to a fourth application of the fourth to seventh embodiments, the base station database device 45 includes, instead of the position estimation calculation section 45*c*, a position estimation calculation section which performs processing for reading the latitudes and longitudes of the base stations in the base station information respectively associated with the acquired base station IDs C1, C2 from the base station information table 15*a* when the plurality of acquired base station IDs C1, C2 are received from the wireless base station, and determining an average of the latitudes and longitudes of the base stations as the estimated latitude and longitude of the mobile communication terminal. Therefore, the position transmission section 15*d* sends information of the estimated latitude and longitude of the mobile communication terminal obtained by the position estimation calculation section to the relevant wireless base station.

Thereby, even if the mobile communication terminal is in an environment where the terminal cannot communicate with a GPS, an average of the latitudes and longitudes of a plurality of wireless base stations having areas in which the mobile communication terminal is located is obtained, and is estimated as the latitude and longitude of the mobile communication terminal, so that the position of the terminal can be more accurately estimated compared to estimation from the latitude and longitude information of one wireless base station.

Application of the First to Seventh Embodiments

Figure 15:
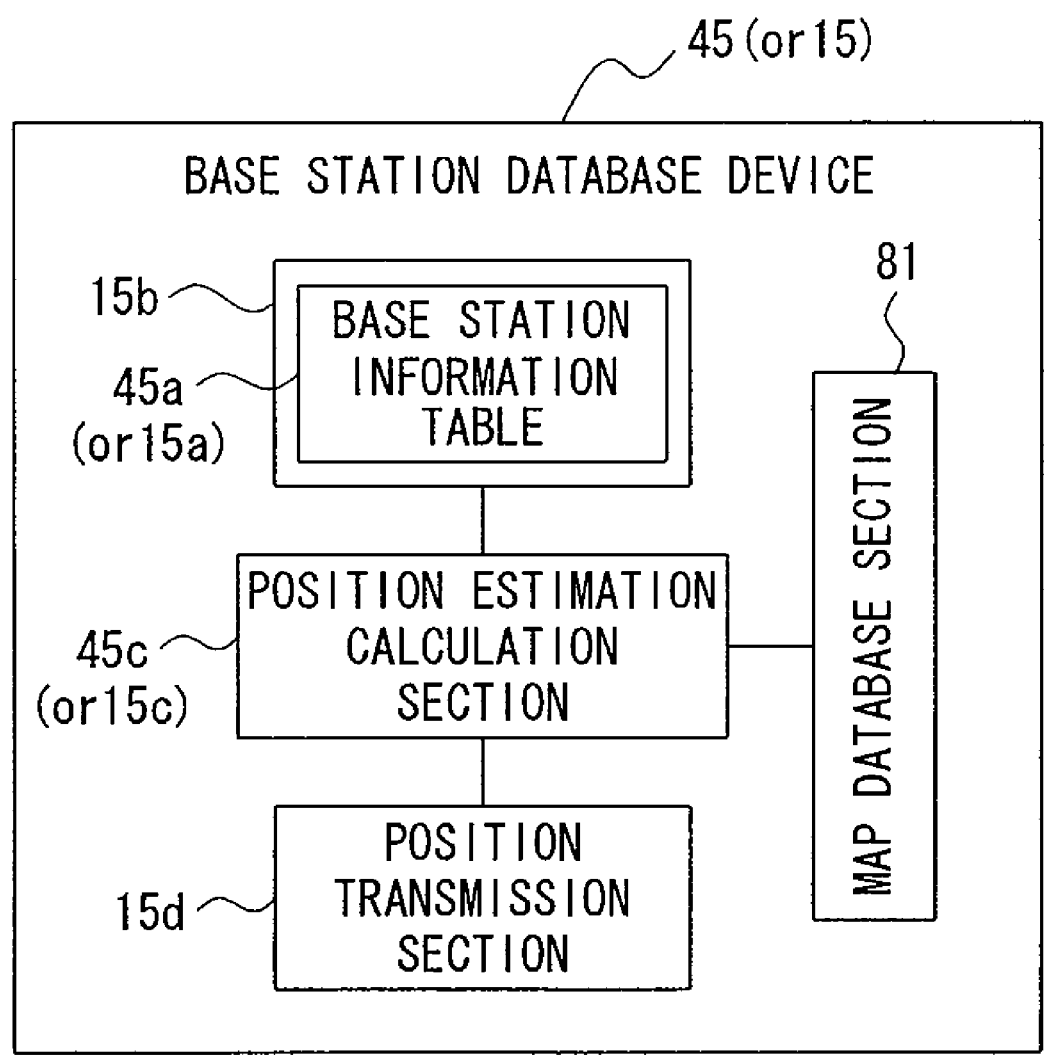
FIG. 15 is a block diagram which shows a configuration of a base station database device having a map database section of the position estimation system.

According to an application of the first to seventh embodiments, as shown in FIG. 15, the base station database device 45 (or 15) further includes a map database section 81 which stores map information in which an exceptional location such as on the sea is defined, and, after the position estimation calculation section 45*c* (or 15*c*) obtains the estimated latitude and longitude of the mobile communication terminal by the above described latitude and longitude estimation calculation, the position estimation calculation section 45*c* (or 15c) clears information of the estimated latitude and longitude if the estimated latitude and longitude corresponds to the exceptional location in the map information of the map database section 81.

Thus, if an estimated latitude and longitude of a mobile communication terminal that has been once obtained by the position estimation calculation section 45*c* (or 15c) is determined to be on the exceptional location such as on the sea while the mobile communication terminal exists on land, information of the estimated latitude and longitude is not sent to the mobile communication terminal, so that false estimated latitude and longitude information can be prevented from being sent to the mobile communication terminal. Further, the configuration of this application may be combined with that of the above described first to fourth applications.

The position estimation system according to the present invention can be applied to a case where a position of a mobile communication terminal such as a cellular phone which performs wireless communication by W-CDMA is estimated based on information received from a wireless base station in an environment where the terminal cannot communicate with a GPS.

What is claimed is:
1. A position estimation system comprising:
a mobile communication terminal;
a base station which wirelessly communicates with the mobile communication terminal and which holds its own base station ID that is unique information; and
a database device which holds an information table having base station information including a latitude, a longitude, a tilt angle, an antenna aperture angle, antenna directivity, and an antenna height of the base station which are associated with the base station ID,
wherein the position estimation system estimates a position of the mobile communication terminal located in a radio area of the base station by using the database device, even in an environment where the mobile communication terminal cannot communicate with a Global Positioning System,
wherein the base station comprises:
an ID transmission section for sending the base station ID to the database device when the mobile communication terminal requests acquisition of the position; and
a relay section for relaying information of an estimated latitude and longitude of the mobile communication terminal which is sent from the database device to the mobile communication terminal requesting the acquisition of the position,
wherein the database device comprises:
a calculating section for performing processing for reading the base station information associated with the base station ID from the information table when the base station ID is received, obtaining a latitude and a longitude of the center of a sector that is the centroid of gravity of the sector in the radio area of the base station according to a predetermined calculation using the base station information, and determining the obtained latitude and longitude as the estimated latitude and longitude of the mobile communication terminal; and
a position transmission section for sending the information of the estimated latitude and longitude of the mobile communication terminal obtained by the calculating section to the relevant base station,
wherein, for obtaining the latitude and the longitude of the center of the sector, the calculating section comprises: a first calculating section for obtaining a cell radius of the radio area of the base station by use of information of the tilt angle and the antenna height from the base station information; a second calculating section for obtaining a distance between the base station and the center of the sector by use of information of the cell radius obtained by the first calculating section, the antenna directivity, and the antenna aperture angle, and position coordinates of the center of the sector; and a third calculating section for converting the position coordinates of the center of the sector obtained by the second calculating section into a latitude and a longitude, so that the calculating section obtains latitude and longitude of the center of the sector by use of the latitude and longitude converted by the third calculating section and information on a latitude and a longitude of the base station, and outputs the latitude and longitude of the center of the sector as the estimated latitude and longitude, and
wherein the mobile communication terminal identifies the relayed information of the estimated latitude and longitude of the mobile communication terminal as position information of the latitude and the longitude of the mobile communication terminal.
2. A position estimation system comprising:
a position request terminal which specifies a terminal ID of any mobile communication terminal and which requests acquisition of a position of the relevant mobile communication terminal;
a mobile communication terminal which holds its own terminal ID that is unique information;
a base station which wirelessly communicates with the mobile communication terminal as well as communicates with the position request terminal via a relay server, and which holds its own base station ID that is unique information; and
a database device which holds an information table having base station information including a latitude, a longitude, a tilt angle, an antenna aperture angle, an antenna directivity, and an antenna height of the base station which are associated with the base station ID, the position estimation system estimating the position of the mobile communication terminal located in a radio area of the base station by the database device when the acquisition of the position is requested, even in an environment where the mobile communication terminal cannot communicate with a Global Positioning System, wherein the base station comprises:

a request transmission section for, when position acquisition request information including the terminal ID at a time when the acquisition of the position is requested is received, sending the information to the mobile communication terminal;

an ID transmission section for sending the base station ID to the database device when a response signal is received from the mobile communication terminal in response to the request for the acquisition of the position sent by the request transmission section; and a relay section for relaying information of an estimated latitude and longitude of the mobile communication terminal which is sent from the database device to the request terminal requesting the acquisition of the position, wherein the mobile communication terminal comprises an acknowledgement section for sending back the response signal to the base station which has sent the request for the acquisition of the position if the terminal ID included in the position acquisition request information received from the base station is identical to the terminal ID held by the mobile communication terminal, wherein the database device comprises:

a calculating section for performing processing for reading the base station information associated with the base station ID from the information table when the base station ID is received, obtaining a latitude, a longitude of the center of a sector that is the centroid of gravity of the sector in the radio area of the base station according to a predetermined calculation using the base station information, and determining the obtained latitude and longitude as the estimated latitude and longitude of the mobile communication terminal; and a position transmission section for sending the information of the estimated latitude and longitude of the mobile communication terminal obtained by the calculating section to the base station, wherein, for obtaining the latitude and the longitude of the center of the sector, the calculating section comprises: a first calculating section for obtaining a cell radius of the radio area of the base station by use of information of the tilt angle and the antenna height from the base station information; a second calculating section for obtaining a distance between the base station and the center of the sector by use of information of the cell radius obtained by the first calculating section, the antenna directivity, and the antenna aperture angle, and position coordinates of the center of the sector; and a third calculating section for converting the position coordinates of the center of the sector obtained by the second calculating section into a latitude and a longitude, so that the calculating section obtains latitude and longitude of the center of the sector by use of the latitude and longitude converted by the third calculating section and information on a latitude and a longitude of the base station, and outputs the latitude and longitude of the center of the sector as the estimated latitude and longitude, and wherein the request terminal identifies the relayed information of the estimated latitude and longitude of the mobile communication terminal as position information of the latitude and the longitude of the mobile communication terminal whose position is requested to be acquired.

3. A position estimation system comprising:

a mobile communication terminal which holds its own terminal ID that is unique information;

a base station which wirelessly communicates with the mobile communication terminal as well as communicates with a position acquisition terminal via a relay server, and which holds its own base station ID that is unique information; and a database device which holds an information table having base station information including a latitude, a longitude, a tilt angle, an antenna aperture angle, an antenna directivity, and an antenna height of the base station which are associated with the base station ID, the position estimation system estimating a position of the mobile communication terminal by using the database device when the mobile communication terminal notifies the position acquisition terminal of the position of the mobile communication terminal, even in an environment where the mobile communication terminal cannot communicate with a Global Positioning System, wherein the mobile communication terminal comprises:

a position notification section for notifying the position acquisition terminal of the position of the mobile communication terminal using position notification information including a position acquisition terminal ID that is unique information of the position acquisition terminal and the terminal ID of the mobile communication terminal, wherein the base station comprises:

an ID transmission section for sending the base station ID to the database device when the position notification request information is received; and a relay section for adding the position acquisition terminal ID and the terminal ID of the terminal requesting the position notification request to estimated latitude and longitude information of the mobile communication terminal sent from the database device and sending the estimated latitude and longitude information to the relay server, wherein the relay server comprises a recognition transmission section for recognizing the position acquisition terminal ID included in the estimated latitude and longitude information from the base station and sending the estimated latitude and longitude information to the position acquisition terminal having the recognized ID, wherein the database device comprises:

a calculating section for performing processing for reading the base station information associated with the base station ID from the information table when the base station ID is received, obtaining a latitude, a longitude of a center of the sector that is the centroid of gravity of the sector in a radio area of the base station according to a predetermined calculation using the base station information, and determining the obtained latitude and longitude as the estimated latitude and longitude of the mobile communication terminal; and a position transmission section for sending the information of the estimated latitude and longitude of the mobile communication terminal obtained by the calculating section to the base station, wherein, for obtaining the latitude and the longitude of the center of the sector, the calculating section comprises: a first calculating section for obtaining a cell radius of the radio area of the base station by use of information of the tilt angle and the antenna height from the base station information; a second calculating section for obtaining a distance between the base station and the center of the sector by use of information of the cell radius obtained by the first calculating section, the antenna directivity, and the antenna aperture angle, and position coordinates of the center of the sector; and a third calculating section for converting the position coordinates of the center of the sector obtained by the second calculating section into a latitude and a longitude, so that the calculating section obtains latitude and longitude of the center of the sector by use of the latitude and longitude converted by the third calculating section and information on a latitude and a longitude of the base station, and outputs the latitude and longitude of the center of the sector as the estimated latitude and longitude, and wherein the position acquisition terminal identifies the estimated latitude and longitude information sent form the relay server as position information of the latitude and the longitude of the mobile communication terminal having the terminal ID of the terminal requesting the position notification request that is included in the estimated latitude and longitude information.

4. A position estimation system comprising:

a base station which holds its own base station ID that is unique information;

a mobile communication terminal which stores acquired base station IDs that are IDs of a plurality of base stations acquirable through wireless communication; and a database device which holds an information table having base station information including a latitude, a longitude, a tilt angle, an antenna aperture angle, an antenna directivity, and an antenna height of each base station which are associated with each respective base station ID, the position estimation system estimating a position of the mobile communication terminal located in a radio area of the base station by the database device, even in an environment where the mobile communication terminal cannot communicate with a Global Positioning System, wherein the mobile communication terminal comprises an acquired ID transmission section for, in response to a request for acquisition of the acquired base station IDs sent from the base station in response to a request for acquisition of a position of the mobile communication terminal, sending the plurality of acquired base station IDs held by the mobile communication terminal to the base station requesting the acquisition of the acquired base station IDs, wherein the base station comprises:

an acquired ID requesting section for requesting acquisition of the acquired base station IDs when the mobile communication terminal requests the acquisition of the position;

an ID sending/receiving section for receiving the plurality of acquired base station IDs sent in response to the request for the acquisition request and sending the acquired base station IDs to the database device; and a relay section for relaying information of an estimated latitude and longitude of the mobile communication terminal which is sent from the database device to the mobile communication terminal requesting the acquisition of the position, wherein the database device comprises:

a calculating section for performing processing for reading the base station information associated with each of the acquired base station IDs from the information table when the plurality of acquired base station IDs are received, obtaining a latitude, a longitude of the center of a sector that is the centroid of gravity of the sector in the radio area for each of the base stations having the respective acquired base station IDs according to a predetermined calculation using the base station information, and determining an average of the obtained latitudes and longitudes as the estimated latitude and longitude of the mobile communication terminal; and a position transmission section for sending the information of the estimated latitude and longitude of the mobile communication terminal obtained by the calculating section to the relevant base station, wherein, for obtaining the latitude and the longitude of the center of the sector, the calculating section comprises: a first calculating section for obtaining a cell radius of the radio area of the base station by use of information of the tilt angle and the antenna height from the base station information; a second calculating section for obtaining a distance between the base station and the center of the sector by use of information of the cell radius obtained by the first calculating section, the antenna directivity, and the antenna aperture angle, and position coordinates of the center of the sector; and a third calculating section for converting the position coordinates of the center of the sector obtained by the second calculating section into a latitude and a longitude, so that the calculating section obtains latitude and longitude of the center of the sector by use of the latitude and longitude converted by the third calculating section and information on a latitude and a longitude of the base station, and outputs the latitude and longitude of the center of the sector as the estimated latitude and longitude, and wherein the mobile communication terminal identifies the relayed information of the estimated latitude and longitude of the mobile communication terminal as position information of a latitude and a longitude of the mobile communication terminal.

5. A position estimation system comprising:

a position request terminal which specifies a terminal ID of any mobile communication terminal and requests acquisition of a position of the relevant mobile communication terminal;

a base station which communicates with the position request terminal via a relay server and holds its own base station ID that is unique information;

a mobile communication terminal which stores acquired base station IDs that are IDs of a plurality of base station acquirable through wireless communication; and a database device which holds an information table having base station information including a latitude, a longitude, a tilt angle, an antenna aperture angle, an antenna directivity, and an antenna height of each base station which are associated with each respective base station ID, the position estimation system estimating the position of the mobile communication terminal located in a radio area of the base station by the database device when the acquisition of the position is requested, even in an environment where the mobile communication terminal cannot communicate with a Global Positioning System, wherein the base station comprises:

a request transmission section for, when position acquisition request information including the terminal ID at a time when the acquisition of the position is requested is received, sending the information to the mobile communication terminal;

an ID sending/receiving section for receiving the plurality of acquired base station IDs from the mobile communication terminal in response to the request for the acquisition of the position sent by the request transmission section and sending the plurality of acquired base station IDs to the database device; and a relay section for relaying information of an estimated latitude and longitude of the mobile communication terminal which is sent from the database device to the request terminal requesting the acquisition of the position, wherein the mobile communication terminal comprises a check/transmission section for sending the plurality of acquired base station IDs held by the mobile communication terminal to the base station which has sent the position acquisition request information if the terminal ID included in the position acquisition request information received from the base station is identical to the terminal ID held by the mobile communication terminal, wherein the database device comprises:

a calculating section for performing processing for reading the base station information associated with each of the acquired base station IDs from the information table when the plurality of acquired base station IDs are received, obtaining a latitude and a longitude of the center of a sector that is the centroid of gravity of the sector in the radio area for each of the base stations having the respective acquired base station IDs according to a predetermined calculation using the base station information, and determining an average of the obtained latitudes and longitudes as the estimated latitude and longitude of the mobile communication terminal; and a position transmission section for sending the information of the estimated latitude and longitude of the mobile communication terminal obtained by the calculating section to the relevant base station, wherein, for obtaining the latitude and the longitude of the center of the sector, the calculating section comprises: a first calculating section for obtaining a cell radius of the radio area of the base station by use of information of the tilt angle and the antenna height from the base station information; a second calculating section for obtaining a distance between the base station and the center of the sector by use of information of the cell radius obtained by the first calculating section, the antenna directivity, and the antenna aperture angle, and position coordinates of the center of the sector; and a third calculating section for converting the position coordinates of the center of the sector obtained by the second calculating section into a latitude and a longitude, so that the calculating section obtains latitude and longitude of the center of the sector by use of the latitude and longitude converted by the third calculating section and information on a latitude and a longitude of the base station, and outputs the latitude and longitude of the center of the sector as the estimated latitude and longitude, and wherein the request terminal identifies the relayed information of the estimated latitude and longitude of the mobile communication terminal as position information of a latitude and a longitude of the mobile communication terminal whose position is requested to be acquired.

6. A position estimation system comprising:

a mobile communication terminal which stores its own terminal ID which is unique information and acquired base station IDs which are IDs of a plurality of base stations acquirable through wireless communication;

a base station which wirelessly communicates with the mobile communication terminal as well as communicates with a position acquisition terminal via a relay server; and a database device which holds an information table having base station information including a latitude, a longitude, a tilt angle, an antenna aperture angle, an antenna directivity, and an antenna height of each base station which are associated with each respective base station ID, the position estimation system estimating a position of the mobile communication terminal by the database device when the mobile communication terminal notifies the position acquisition terminal of the position of the mobile communication terminal, even in an environment where the mobile communication terminal cannot communicate with a Global Positioning System, wherein the mobile communication terminal comprises a position notification section for notifying the position acquisition terminal of the position of the mobile communication terminal using position notification information including a position acquisition terminal ID that is unique information of the position acquisition terminal, the acquired base station IDs, and the terminal ID of the mobile communication terminal, wherein the base station comprises a request receiving section for receiving the position notification request information and obtains the acquired base station IDs, the position acquisition terminal ID, and the terminal ID in the information;

an ID sending/receiving section for sending the acquired base station IDs obtained by the request receiving section to the database device; and a relay section for adding the position acquisition terminal ID and terminal ID obtained by the request receiving section to estimated latitude and longitude information of the mobile communication terminal sent from the database device and sending the estimated latitude and longitude information to the relay server, wherein the relay server comprises a recognition transmission section for recognizing the position acquisition terminal ID included in the estimated latitude and longitude information from the base station and sending the estimated latitude and longitude information to the position acquisition terminal having the recognized ID, wherein the database device comprises:

a calculating section for performing processing for reading the base station information associated with each of the acquired base station IDs from the information table when the plurality of acquired base station IDs are received, obtaining a latitude, a longitude of a center of the sector that is the centroid of gravity of the sector in the radio area for each of the base stations having the respective acquired base station IDs according to a predetermined calculation using the base station information, and determining an average of the obtained latitudes and longitudes as the estimated latitude and longitude of the mobile communication terminal; and a position transmission section for sending the information of the estimated latitude and longitude of the mobile communication terminal obtained by the calculating section to the relevant base station, wherein, for obtaining the latitude and the longitude of the center of the sector, the calculating section comprises: a first calculating section for obtaining a cell radius of the radio area of the base station by use of information of the tilt angle and the antenna height from the base station information; a second calculating section for obtaining a distance between the base station and the center of the sector by use of information of the cell radius obtained by the first calculating section, the antenna directivity, and the antenna aperture angle, and position coordinates of the center of the sector; and a third calculating section for converting the position coordinates of the center of the sector obtained by the second calculating section into a latitude and a longitude, so that the calculating section obtains latitude and longitude of the center of the sector by use of the latitude and longitude converted by the third calculating section and information on a latitude and a longitude of the base station, and outputs the latitude and longitude of the center of the sector as the estimated latitude and longitude, and wherein the position acquisition terminal identifies the estimated latitude and longitude information sent form the relay server as position information of a latitude and a longitude of the mobile communication terminal having the terminal ID of the terminal requesting the position notification request that is included in the estimated latitude and longitude information.

7. A position estimation system comprising:

a position request terminal which specifies a terminal ID of any mobile communication terminal and requests acquisition of a position of the relevant mobile communication terminal;

a base station which communicates with the position request terminal via a relay server and holds its own base station ID that is unique information;

a mobile communication terminal which stores acquired base station IDs that are IDs of a plurality of base stations acquirable through wireless communication; and a database device which holds an information table having base station information including a latitude, a longitude, a tilt angle, an antenna aperture angle, an antenna directivity, and an antenna height of each base station which are associated with each respective base station ID, the position estimation system estimating the position of the mobile communication terminal located in a radio area of the base station by the database device when the acquisition of the position is requested, even in an environment where the mobile communication terminal cannot communicate with a Global Positioning System, wherein the mobile communication terminal comprises an acquired ID transmission section for sending its own terminal ID associated with the acquired base station IDs to the relevant base station when the mobile communication terminal is located in the radio area of the base station, wherein the base station comprises:

an acquired ID receiving section for receiving the acquired base station IDs paired with the terminal ID from the mobile communication terminal;

a terminal ID information storage section for storing the received acquired base station IDs paired with the terminal ID;

a location checking/ID transmission section for, when position acquisition request information including the terminal ID at a time when the acquisition of the position is requested is received, if the mobile communication terminal having the relevant terminal ID is located in the area of the base station, sending the acquired base station IDs paired with the relevant terminal ID stored by the terminal ID information storage section to the database device; and a relay section for relaying information of an estimated latitude and longitude of the mobile communication terminal which is sent from the database device to the request terminal requesting the acquisition of the position, wherein the database device comprises:

a calculating section for performing processing for reading the base station information associated with each of the acquired base station IDs from the information table when the plurality of acquired base station IDs are received, obtaining a latitude, a longitude of the center of a sector that is the centroid of gravity of the sector in the radio area for each of the base stations having the respective acquired base station IDs according to a predetermined calculation using the base station information, and determining an average of the obtained latitudes and longitudes as the estimated latitude and longitude of the mobile communication terminal; and a position transmission section for sending the information of the estimated latitude and longitude of the mobile communication terminal obtained by the calculating section to the relevant base station, wherein, for obtaining the latitude and the longitude of the center of the sector, the calculating section comprises: a first calculating section for obtaining a cell radius of the radio area of the base station by use of information of the tilt angle and the antenna height from the base station information; a second calculating section for obtaining a distance between the base station and the center of the sector by use of information of the cell radius obtained by the first calculating section, the antenna directivity, and the antenna aperture angle, and position coordinates of the center of the sector; and a third calculating section for converting the position coordinates of the center of the sector obtained by the second calculating section into a latitude and a longitude, so that the calculating section obtains latitude and longitude of the center of the sector by use of the latitude and longitude converted by the third calculating section and information on a latitude and a longitude of the base station, and outputs the latitude and longitude of the center of the sector as the estimated latitude and longitude, and wherein the request terminal identifies the relayed information of the estimated latitude and longitude of the mobile communication terminal as position information of the latitude and longitude of the mobile communication terminal whose position is requested to be acquired.

8. The position estimation system according to any one of claims 4 to 7, wherein each base station ID of the information table is associated with a priority level, and the calculating section performs processing for obtaining the latitude and longitude of the center of the sector for each of the base stations and then determining the latitude and longitude of the center of the sector of the base station having a base station ID which is higher in the priority level as the estimated latitude and longitude of the mobile communication terminal.

9. The position estimation system according to any one of claims 4 to 7, wherein each base station ID of the information table is associated with an exception flag which represents a wireless base station in a narrow area where a plurality of wireless base stations are installed, and the calculating section is not allowed to perform calculation to obtain the latitude and the longitude of the center of the sector of the base station having the base station ID that is associated with the exception flag.

10. The position estimation system according to any one of claims 4 to 7, wherein the calculating section is not allowed to perform calculation to obtain the latitude and the longitude of the center of the sector of the base station having a base station ID associated with the tilt angle if the tilt angle is zero degrees.

11. The position estimation system according to claim 9, wherein the calculating section obtains the latitude and longitude of the center of the sector of the base station having the base station ID that is not associated with the exception flag, and when the obtained latitude and longitude is determined as the estimated latitude and longitude of the mobile communication terminal, adds an error on a random basis to the estimated latitude and longitude.

12. The position estimation system according to claim 10, wherein the calculating section obtains the latitude and longitude of the center of the sector of the base station having the base station ID that is not associated with the tilt angle, when the tilt angle is zero degrees, and when the obtained latitude and longitude is determined as the estimated latitude and longitude of the mobile communication terminal, adds an error on a random basis to the estimated latitude and longitude.

13. The position estimation system according to any one of claims 1 to 7,
wherein the database device further comprises a map database section for storing map information in which an exceptional location is defined, and
wherein, after obtaining the estimated latitude and longitude of the mobile communication terminal, the calculating section performs processing for deleting information of the estimated latitude and longitude if the estimated latitude and longitude corresponds to the exceptional location in the map information of the map database section.

14. The position estimation system according to any one of claims 4 to 7,
wherein the second calculating section reads the latitudes and the longitudes of the respective base stations in the base station information associated with the respective acquired base station IDs from the information table when the plurality of acquired base station IDs are received, and determining an average of the latitudes and longitudes of the base stations as the estimated latitude and longitude of the mobile communication terminal, and
wherein the position transmission section sends information of the estimated latitude and longitude of the mobile communication terminal obtained by the second calculating section to the relevant base station.

15. The position estimation system according to claim 14,
wherein the database device further comprises a map database section for storing map information in which an exceptional location is defined, and
wherein, after obtaining the estimated latitude and longitude of the mobile communication terminal, the second calculating section performs processing for deleting information of the estimated latitude and longitude if the estimated latitude and longitude corresponds to the exceptional location in the map information of the map database section.

* * * * *